(12) United States Patent
Strong

(10) Patent No.: US 8,654,607 B2
(45) Date of Patent: Feb. 18, 2014

(54) SYSTEM AND METHOD FOR DETERMINING WAVE CHARACTERISTICS FROM A MOVING PLATFORM

(75) Inventor: Brandon S. Strong, San Diego, CA (US)

(73) Assignee: Teledyne RD Instruments, Inc., Poway, CA (US)

(*) Notice: Subject to any disclaimer, the term of this patent is extended or adjusted under 35 U.S.C. 154(b) by 39 days.

(21) Appl. No.: 12/788,155

(22) Filed: May 26, 2010

(65) Prior Publication Data

US 2010/0302908 A1 Dec. 2, 2010

Related U.S. Application Data

(60) Provisional application No. 61/181,585, filed on May 27, 2009.

(51) Int. Cl.
*G01S 15/00* (2006.01)
*G01S 15/58* (2006.01)

(52) U.S. Cl.
CPC ............................... *G01S 15/582* (2013.01)
USPC ........................................................ 367/90

(58) Field of Classification Search
USPC ........................................................ 367/90
See application file for complete search history.

(56) References Cited

U.S. PATENT DOCUMENTS

| | | |
|---|---|---|
| 3,648,225 A | 3/1972 | Kritz et al. |
| 3,803,606 A | 4/1974 | Lebail et al. |
| 4,050,055 A | 9/1977 | DiLeo |
| 4,062,237 A | 12/1977 | Fox |
| 4,078,234 A | 3/1978 | Fishbein et al. |
| 4,138,657 A | 2/1979 | Shave |
| 4,219,887 A | 8/1980 | MacCready, Jr. |
| 4,244,026 A | 1/1981 | Dickey, Jr. |
| 4,270,191 A | 5/1981 | Peynaud |
| 4,320,765 A | 3/1982 | Cathignol et al. |

(Continued)

FOREIGN PATENT DOCUMENTS

| | | |
|---|---|---|
| GB | 2128833 | 5/1984 |
| JP | HEI 3-53605 | 12/1992 |

(Continued)

OTHER PUBLICATIONS

Glad, I.K., et al. (1992) The maximum-likelihood property of estimators of wave parameters from heave, pitch, and roll buoys. American Meteorological Society V.9:169-173.

(Continued)

*Primary Examiner* — Isam Alsomiri
*Assistant Examiner* — James Hulka
(74) *Attorney, Agent, or Firm* — Knobbe, Martens, Olson & Bear, LLP

(57) ABSTRACT

A system and a method for determining one or more wave characteristics from a moving platform are disclosed. A sonar system, such as an Acoustic Doppler Current Profiler, can profile the water motion relative to the platform, and an earth reference can determine a measure of the platform motion relative to a fixed earth reference. Both water profile and earth reference measurements can be synergistically employed to compensate for motion of the platform. Directional wave spectra and non-directional wave spectrum can be computed and translated via linear wave theory to surface height spectra and used to calculate characteristics, such as significant wave height, peak period, and peak direction.

28 Claims, 22 Drawing Sheets

(56) References Cited

U.S. PATENT DOCUMENTS

| | | | |
|---|---|---|---|
| 4,603,408 A | 7/1986 | Singhal et al. | |
| 4,640,292 A | 2/1987 | Tykulsky et al. | |
| 4,751,847 A | 6/1988 | Katakura et al. | |
| 4,794,574 A | 12/1988 | Grall | |
| 4,799,490 A | 1/1989 | Namekawa | |
| 4,831,874 A | 5/1989 | Daubin et al. | |
| 4,847,817 A | 7/1989 | Au et al. | |
| 4,872,146 A | 10/1989 | Farmer et al. | |
| 4,960,329 A | 10/1990 | Schofield | |
| 5,208,785 A | 5/1993 | Brumley et al. | |
| 5,483,499 A | 1/1996 | Brumley et al. | |
| 5,521,883 A | 5/1996 | Fage et al. | |
| 5,561,641 A * | 10/1996 | Nishimori et al. | 367/90 |
| 5,615,173 A | 3/1997 | Brumley et al. | |
| RE35,535 E | 6/1997 | Brumley et al. | |
| 5,689,445 A | 11/1997 | Vogt et al. | |
| 6,052,334 A | 4/2000 | Brumley et al. | |
| 6,213,947 B1 | 4/2001 | Phillips | |
| 6,262,942 B1 | 7/2001 | Stanton | |
| 6,282,151 B1 | 8/2001 | Brumley et al. | |
| 6,314,053 B1 | 11/2001 | Doisy et al. | |
| 6,453,256 B1 | 9/2002 | Gordon et al. | |
| 6,539,323 B2 | 3/2003 | Olson | |
| 6,647,804 B1 | 11/2003 | Deines | |
| 6,700,834 B2 | 3/2004 | Brumley et al. | |
| 6,701,252 B2 | 3/2004 | Brown | |
| 6,820,008 B1 | 11/2004 | van Smirren et al. | |
| 6,937,938 B2 | 8/2005 | Sansone | |
| 6,947,880 B2 | 9/2005 | Johnson et al. | |
| 6,983,208 B2 | 1/2006 | Metcalf et al. | |
| 7,007,555 B2 | 3/2006 | Strong et al. | |
| 7,173,880 B2 | 2/2007 | Bernard | |
| 7,267,013 B2 | 9/2007 | Maier | |
| 7,277,359 B2 | 10/2007 | Bernard | |
| 7,317,660 B2 | 1/2008 | Brumle et al. | |
| 7,343,793 B2 | 3/2008 | Tillotson et al. | |
| 7,352,651 B2 | 4/2008 | Lohrmann et al. | |
| 7,379,387 B2 | 5/2008 | Strong et al. | |
| 7,420,875 B1 | 9/2008 | Hendricks | |
| 7,545,705 B2 | 6/2009 | Brumley et al. | |
| 7,613,072 B2 | 11/2009 | Lohrmann et al. | |
| 7,768,874 B2 | 8/2010 | Strong et al. | |
| 2002/0018400 A1 | 2/2002 | Brumley et al. | |
| 2002/0124629 A1 | 9/2002 | Hurson | |
| 2003/0061008 A1* | 3/2003 | Smith et al. | 702/188 |
| 2004/0184350 A1 | 9/2004 | Brumley et al. | |
| 2005/0015009 A1* | 1/2005 | Mourad et al. | 600/438 |
| 2005/0199056 A1 | 9/2005 | Strong et al. | |
| 2006/0155492 A1 | 7/2006 | Strong et al. | |
| 2007/0019505 A1 | 1/2007 | Lohrmann et al. | |
| 2007/0030996 A1* | 2/2007 | Winger et al. | 382/100 |
| 2007/0118286 A1* | 5/2007 | Wang et al. | 701/213 |
| 2007/0121966 A1* | 5/2007 | Plastina et al. | 381/104 |
| 2008/0002390 A1* | 1/2008 | Paillard | 362/85 |
| 2008/0034869 A1* | 2/2008 | Heinz et al. | 73/572 |
| 2008/0239869 A1 | 10/2008 | Lohrmann et al. | |

FOREIGN PATENT DOCUMENTS

| | | |
|---|---|---|
| JP | 2695989 | 4/1994 |
| JP | 7218254 | 8/1995 |
| JP | 09-164142 | 6/1997 |
| JP | 10197549 | 7/1998 |
| JP | 2948472 | 7/1999 |
| JP | 2000-077926 | 3/2000 |
| JP | 2002-526783 | 8/2002 |
| JP | 2005-265845 | 9/2005 |
| JP | 2006-284242 | 10/2006 |

OTHER PUBLICATIONS

Hashimoto, N., et al. (1996) Improvement of submerged Doppler-type directional wave meter and its application to field observations. Coastal Engineering 629-642.

Herbers, T.H., et al. (1991) Field Verification of Acoustic Doppler Surface Gravity Wave Measurements. Journal of Geophysical Research V.96, No. C9:17,023-17,035.

Krogstad, H.E., et al. (1988) High-resolution directional wave spectra from horizontally mounted acoustic Doppler current meters. Journal of Atmospheric and Oceanic Technology V.5, No. 4: 340-352.

Pinkel, R. et al. (1987) Open ocean surface wave measurement using Doppler sonar. Journal of Geophysical Research V.92, no. C12:12,967-12.973.

Smith, J. A. (1989) Doppler sonar and surface waves: range and resolution. Journal of Atmospheric and Oceanic Technology V6:680-696.

Smith, J.A., et al. (1995) Directional surface wave estimates from Doppler sonar data. Journal of Atmospheric and Oceanic Technology V.12:617-632.

Stockhausen, W.T. (1994) Directional wave spectra using an acoustic doppler current profiler. A Thesis. Library of the Virginia Institute of Marine Science.

Takayama, T., et al. (1994) Development of a submerged Doppler-type directional wave meter. Coastal Engineering C.46:624-634.

Terray, E.A., et al. (1990) Measuring wave direction using upward-looking Doppler sonar. Proceedings of the IEEE Fourth Working Conference on Current Measurement 1-6 and Fig. 1-Fig. 4.

Terray, E., et al. (1997) Measuring wave height and direction using upward-looking ADCP's. IEEE Oceans '97 1-4.

Visbeck, M., et al. (1995) Sea surface conditions remotely sensed by upward-looking ADCP's. Journal of Atmospheric and Oceanic Technology V12:141-149.

Zedel, L. (1994) Deep ocean wave measurements using a vertically oriented sonar. Journal of Atmospheric and Oceanic Technology V.11:182-191.

Kirlin, R. Lynn, Estimation of Transfer Function Parameters with Output Fourier Transform Sensitivity Vectors. 1977 IEEE International Conference on Acoustics, Speech and Signal Processing (Cat. No. 97CB36052) Munich, Germany, Apr. 21-24, 1997, pp. 3933-3936 vol. 5.

Allender, et al., "The WADIC Project: A Comprehensive Field Evaluation of Directional Wave Instrumentation,"Ocean Engineering, vol. 16, No. 56, pp. 505-536, 1989.

Haug, "Estimations of Directional Spectra by ML/ME Methods, "Proc. Ocean Wave Measurement and Analysis, pp. 394-405, Jul. 1993.

Krogstad, "Maximum Likelihood Estimation of Ocean Wave Spectra from General Arrays of Wave Gauges, "Modeling, Identification, and Control, vol. 9, No. 2, pp. 81-97, 1988.

Terray E. et al., Measuring Waves and Currents With an Upward-Looking ADCP, IEEE 1999, 66-71.

PCT International Search Report of Sep. 2, 2010 from the International Searching Authority in application No. PCT/US2010/036243 filed on May 26, 2010 in 91 pages.

Declaration of Brandon S. Strong in 4 pages.

Proposal # 08-22-07-108NAV, 16 pages, dated Aug. 22, 2007. (*Exhibit 1*).

Contract No. N00167-08-9-0065, 16 pages, executed Jan. 4, 2008 and Jan. 8, 2008. (*Exhibit 2*).

Summary of Moving Platform Waves—Design Review Meeting of Feb. 12, 2008, 3 pages. (*Exhibit 3*).

Strong, Brandon S., "Using ADCPs to Determine Waves and Currents from a Dynamically Moving Submarine," 6 pages, Nov. 2008 (*Exhibit 4*).

*Pfaff* v. *Wells Electronics, Inc.*, 525 U.S. 55 (1998).

*Honeywell Int'l, Inc.* v. *Universal Avionics Systems Corp.*, 488 F.3d 982 (Fed. Cir. 2007).

*Leader Technologies, Inc.* v. *Facebook, Inc.*, 678 F.3d 1300 (Fed. Cir. 2012).

*Robotic Vision Systems, Inc.* v. *View Engineering, Inc.*, 249 F.3d 1307 (Fed. Cir. 2001).

European Office Action of Oct. 23, 2013 for European Patent Application No. 10 726 737.9 filed on May 26, 2010. 6 pages.

Japanese Office Action of Nov. 26, 2013 for Japanese Patent Application No. 2012-513227 filed on May 26, 2010. 4 pages; 4 page translation.

* cited by examiner

SYSTEM AND METHOD FOR DETERMINING WAVE CHARACTERISTICS FROM A MOVING PLATFORM

CROSS REFERENCE TO RELATED APPLICATIONS

This application claims the benefit under 35 U.S.C. §119(e) of U.S. Provisional Application No. 61/181,585, filed May 27, 2009, the disclosure of which is herein incorporated by reference in its entirety.

BACKGROUND

1. Field

The disclosed technology relates to underwater acoustic measurement systems and, more particularly, to acoustic Doppler current profilers used to measure wave spectra and wave characteristics.

2. Description of the Related Technology

As described in U.S. Pat. No. 6,052,334, the entire disclosure of which incorporated by reference herein, the use of Doppler sonar to measure currents in a fluid medium is well-established. Conventional acoustic Doppler current profilers (ADCPs) typically use an array of acoustic transducers arranged in the well-known Janus configuration. This configuration consists of four acoustic beams, paired in orthogonal planes. The ADCP measures the component of velocity projected along the beam axis, averaged over a range cell whose beam length is roughly half that of the emitted acoustic pulse. Since the mean current is assumed to be horizontally uniform over the beams, its components can be recovered simply by differencing opposing beams. This procedure is relatively insensitive to contamination by vertical currents and/or unknown instrument tilts.

The analysis of waves in a fluid medium is much more complicated, however. Although the wave field is statistically stationary and homogeneous, at any instant of time the wave velocity varies across the array and as a result it is not possible to separate the measured along-beam velocity into horizontal and vertical components on a sample-by-sample basis. If one sonar beam is vertical, then the frequency spectra in the can be separated, and a crude estimate of direction obtained from the ratio of horizontal velocity spectra. But phase information is irrevocably lost through this procedure and the estimate is substantially biased when the waves are directionally spread. As a result, this estimator is not particularly useful, except perhaps in the case of swell. There is, however, phase information in the cross-correlations between the various range bins, and this fact allows the application of conventional signal processing techniques to estimate wave direction.

The wave directional spectrum (WDS) is a mathematical representation of the wave direction as a function of azimuth angle and wave frequency, which is useful in describing the physical behavior of waves within the fluid medium. The most common existing devices used to obtain wave directional spectra are 1) pitch and roll buoys, and 2) PUV triplets, described in further detail below.

Pitch and roll buoys typically measure tilt in two directions as a surrogate for wave slope, along with the vertical component of acceleration. A variation uses GPS (Global Positioning System) measurements of three velocity components instead. The measured time series are Fourier transformed and the auto-spectra and cross-spectra are formed, resulting in a cross-spectral matrix at each frequency. The elements of the cross-spectral matrix are directly related to the first five Fourier coefficients in direction (through $2\theta$) of the wave directional spectrum at each frequency. These buoys are typically used in deeper water. Unfortunately, the transfer functions for these buoys are complex, non-linear, and often difficult to determine. Additionally, the presence of a mooring line for the buoys adds additional complexity to the analysis due to added motion. Furthermore, such buoys are comparatively costly, vulnerable to weather and theft, and are not capable of measuring currents or wave heights.

PUV triplets (so named due to their measurement of pressure and both components of horizontal velocity, namely u and v) are basically single point electromagnetic current meters having an integral pressure transducer. Time series of pressure and horizontal velocity from PUV triplets are processed in a manner similar to the measurements made by pitch and roll and GPS buoys, also giving only the first five Fourier coefficients in direction at each frequency. PUV triplets are typically bottom mounted, and generally only useful in shallow water. This significant disability is due to the decrease in high frequency response resulting from the decay of wave velocity and pressure with increased water depth.

SUMMARY OF CERTAIN INVENTIVE ASPECTS

The system, method, and computer-readable media of the invention each have several aspects, no single one of which is solely responsible for its desirable attributes. Without limiting the scope of this invention, its more prominent features will now be briefly discussed.

In one embodiment, a system for determining at least one wave characteristic is provided. The system includes a sonar system configured to obtain data indicative of motion of water relative to a platform. The system also includes an earth reference sensor configured to obtain data indicative of motion of the platform relative to a fixed reference frame. In addition, the system includes a processor configured to determine at least one wave characteristic based at least in part on the data indicative of motion of the water relative to the platform and the data indicative of motion of the platform to the fixed reference frame.

In another embodiment, a method of determining at least one wave characteristic is provided. The method includes receiving data indicative of motion of water relative to a platform from an acoustic Doppler current profiler (ADCP). Data indicative of motion of the platform relative to a fixed reference frame from a reference sensor is also received. Using a processor in communication with the ADCP and the reference sensor, at least one wave characteristic is determined based on the received data.

In another embodiment, a method of determining at least one wave characteristic on an electronic device is provided. The method includes receiving data indicative of motion of water relative to a platform and data indicative of motion of the platform relative to a fixed reference frame. At least a portion of the received data is transformed into data indicative of motion of water relative to the fixed reference frame. A directional wave spectrum is determined based at least in part on the transformed data. A non-directional wave spectrum is determined based at least in part on the directional wave spectrum. At least one wave characteristic is derived based at least in part on at least one of the directional wave spectrum and the non-directional wave spectrum.

In another embodiment, a computer-readable storage medium comprising instructions is provided. When executed, the instructions perform a method of: receiving data indicative of motion of water relative to a platform from an acoustic Doppler current profiler (ADCP); receiving data indicative of motion of the platform relative to a fixed reference frame from a reference sensor; and determining, using a processor in communication with the ADCP and the reference sensor, at least one wave characteristic based on the received data.

In yet another embodiment, a computer-readable storage medium comprising instructions is provided. When executed, the instructions perform a method of: receiving data indicative of motion of water relative to a platform and data indicative of motion of the platform relative to a fixed reference frame; transforming at least a portion of the received data into data indicative of motion of water relative to the fixed reference frame; determining a directional wave spectrum based at least in part on the transformed data; determining a non-directional wave spectrum based at least in part on the directional wave spectrum; and deriving at least one wave characteristic based at least in part on at least one of the directional wave spectrum and the non-directional wave spectrum.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

DETAILED DESCRIPTION OF CERTAIN EMBODIMENTS

Figure 1A:
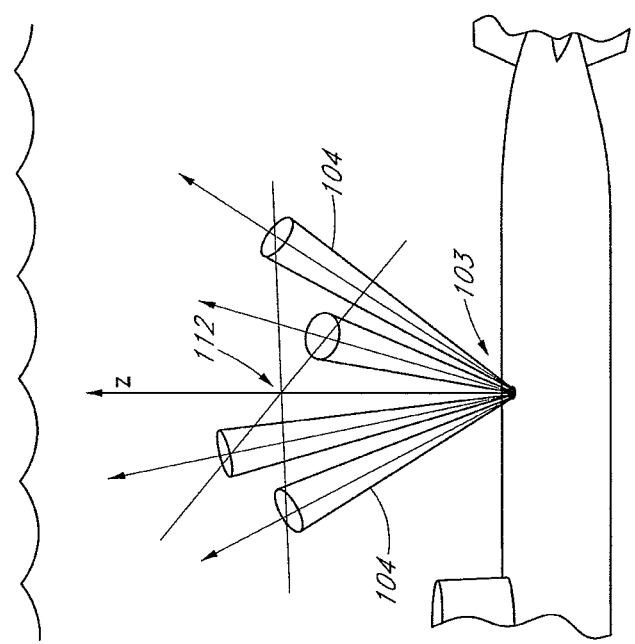
FIG. 1A is a perspective view of an acoustic sonar system used for measuring wave directional spectrum, wave height, and current profile, the system being mounted on a submerged moving platform.

Embodiments described herein involve determining characteristics of waves propagating in a fluid. One embodiment involves determining at least one wave characteristics, which can include wave height, period and direction, at the sea surface, from a moving underwater or surface platform. Such an embodiment can employ an Acoustic Doppler Current Profiler (ADCP) to profile the water motion relative to the platform, and an earth reference means to determine an earth referenced (ER) measure of the platform motion. The earth reference means can comprise an inertial system, a bottom tracking ADCP that measures the platform's motion relative to the earth, or any suitable means that can track the position of the fixed earth reference relative to a moving platform, for example, a GPS system. Both water profile and earth reference measurements can be synergistically employed to compensate for motion of the platform, in which the platform can move with the waves in some unknown, partially correlated fashion. By combining the earth reference data and the profile data an earth relative measurement of subsurface wave orbital velocity can be constructed. Wave processing can be applied to a time series of earth reference orbital velocities, and the resulting spectra can be corrected for motion on different time scales. Platform velocity and attitude can be preserved, as well as earth reference mean currents so that spectra can be corrected for Doppler shift. The resulting Directional Wave Spectra (DWS) and Non-Directional Wave Spectrum (NDWS) can be translated via linear wave theory to surface height spectra and used to calculate such parameters as significant wave height (Hs), peak period (Tp), peak direction (Dp), wave orbital velocity, and/or wave orbital excursion.

One principle behind ADCP wave measurement is that the wave orbital velocities below the surface can be measured by the ADCP. The ADCP can be bottom mounted, upward facing, and have a pressure sensor for measuring tide and mean water depth. Time series of velocities can be accumulated and from these time series, of velocity power spectra can be calculated therefrom. To get a surface height spectrum, the velocity spectrum can be translated to surface displacement using linear wave kinematics. The depth of each bin measured and the total water depth can be used to calculate this translation. To calculate directional spectra, phase information can be preserved and used in this calculation. Each bin in each beam may be an independent sensor in an array. The cross-spectrum can be calculated between each sensor and every other sensor in the array. The result is a cross-spectral matrix that may contain phase information in the path between each sensor and every other sensor at each frequency band. The cross-spectrum at a particular frequency may be linearly related to the directional spectrum at a particular frequency. By inverting this forward relation, we can solve for the directional spectrum. While this phase coherent approach has many advantages for fixed ADCPs, it may have disadvantages for a dynamically moving ADCP.

However, in other embodiments, the phase coherent approach can be used with a dynamically moving ADCP. ADCP measurements of orbital velocity can also support the use of moving platform algorithms. There is a catch 22 associated with coherent processing and motion that makes the problem less tractable than non-phase coherent approaches. With phase coherent approaches, the measured information that allows directional waves to be determined can be the spatial phase differences of the waves spread across the array. In a fixed context, this information can be combined across time to construct a statistical measure of wave direction. The requisite to combining information, sample to sample, measured by the array, can be that the measurements spatially are substantially the same. If, however, the sensors in the array are changing position and orientation from one sample to the next, then combining them in time would have the effect of averaging apples and oranges. The precious phase information about the waves would be confounded by the phase changes introduced by the motion of the array. One could potentially keep track of the exact motion of the array and translate each and every measurement in time as if it were made by an array at a fixed location and orientation, and then combine the information in time. However, in order to do this one would need to know where the waves were exactly at each moment, and the purpose of calculating wave spectra would be defeated. As a consequence of the difficulty of this problem, a non-phase coherent approach is emphasized in this disclosure. Spatial domain processing, rather than time domain processing, can address the phase coherent challenge.

The systems and methods described herein can account for a number of types of motion, including without limitation mooring motion, fixed speed and direction, dynamic speed and direction, and currents. Wave propagation is a long-studied field of physics. Some waves propagate in water. Mean currents can move the water relative to the earth. The platform from which water velocity is being measured may have its own independent motion. Each of these reference frames (water, platform, and earth) can have its own speed and direction. Additionally, there can be dynamic changes in the relative motion, of these reference frames, that span many timescales.

Mooring motion implies the kinds of motion one might see if the system were attached to a mooring line. Rotation, tilts, and orbital motion with the wave orbital velocity are all types of motion that influence the measurement of each sample on short (0.5 sec) time scales. For example, if a system is attached to a neutrally buoyant underwater platform that is rotating, the system may pitch, roll, and heave with subsurface wave energy. The mean velocity of the system can be 0. Mooring motion is particularly challenging because one method of constructing time series of data involves transforming every sample using heading, pitch, and roll to a common reference frame. Additionally, the system may move with the waves in some partially correlated fashion. If the system is always moving with the waves (as in the case of a wave following buoy) or if the system is always stationary (as in a bottom mounted system) then only one measurement may be all that is required. However, since the system's reference frame may move partially, completely, or not at all, with the waves, and this response may change with time, it may be beneficial, in some embodiments, to make two measurements: the motion of the platform to which the system is attached relative to the earth, and the motion of the water relative to the system. This motion can comprise the 3 axes of Velocity and Heading, Pitch, Roll.

Fixed speed and direction implies that the system has a relatively fixed mean speed and direction and depth, for the duration of a wave sampling interval, for example, 10-20 minutes. Mean velocity may influence the solution to this problem as the system can observe waves at a different frequency than they actually are, in the earth reference frame. For example, you are on a boat driving into the waves moving in the opposite direction. The actual period (time between wave crests) in the earth reference frame is 8 seconds. However, because you are moving towards the waves, you observe wave crests every 6 seconds. The waves are not changed on the earth because of your motion but your observation of their frequency is changed. The component (cos [heading-wave direction]) of the waves in the direction of the forward motion influences the results.

Dynamic speed and direction implies that during the wave sampling interval of, e.g., 10-20 minutes, the system changes speed, direction, or depth significantly enough that a mean is no longer representative. For example, an Automated Underwater Vehicle (AUV) navigates North at 10 knots for 2 minutes at 10m depth, then East for 5 minutes at 3 knots, at a depth of 20 m. Dynamic speed may have similar effects to fixed speed, but it may also present different effects on shorter timescales. For example, you drive into the waves for 10 minutes then turn around and drive back with the waves for 10 minutes. Waves on the out going trip are observed at a higher Doppler shifted frequency. Waves on the return trip are observed at lower frequency. The data set may no longer be combinable into a statistically stable 20 minute set without "mixing apples and oranges." In one embodiment, each 10 minute segment is corrected for its motion individually.

Ocean currents can be small, but may still influence the measurement of waves because waves propagating on a mean current are Doppler shifted to a different wavelength than is otherwise represented by the standard dispersion relationship. This may be important when we correct for the observed Doppler shifting of wave frequency due to forward motion. One distinction between the two Doppler shifts is that forward motion does not significantly change the wave frequency in the earth reference frame, but may change the observed frequency in the observed reference frame. So while we may observe waves differently from a moving platform they are still propagating through the water according to the standard dispersion relationship, as if we were not there. By contrast, mean currents do not significantly change frequency but may modify the wavelength of waves at a given frequency. This can change the way waves of a given frequency propagate in the earth reference frame. For example, there are no currents and you are moving into approaching waves. The waves are actually 8 second period, but you observe 6 second period. The orbital velocity felt at 10 meters depth is that of an 8 second period wave. As another example, you are sitting still relative to the earth. There are 8 s period waves propagating against a mean current. The current shortens the wavelength causing the orbital velocity felt at 1 meters depth to be much smaller than typical 8 s period waves.

Figure 1B:
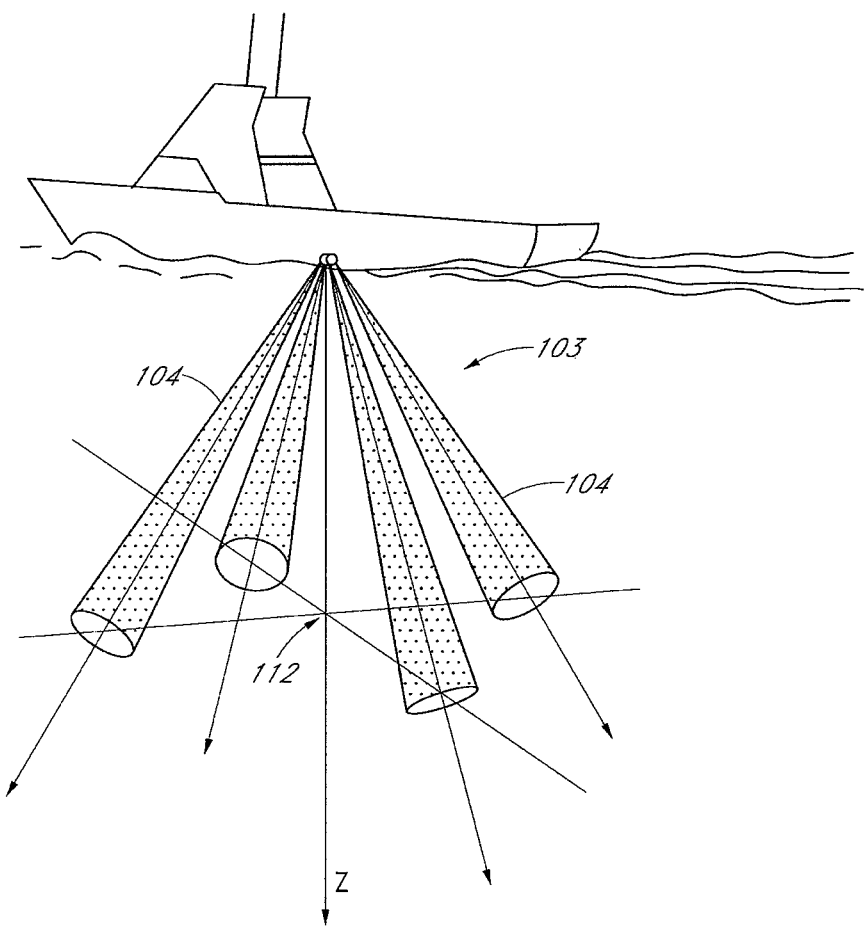
FIG. 1B is a perspective view of a bottom mounted acoustic sonar system used for measuring wave directional spectrum, wave height, and current profile, the system being mounted on a mobile surface platform in a downward looking direction.

FIGS. 1A and 1B illustrate systems that can obtain measurements, which can account for any of the types of motion described above in determining wave spectra. FIG. 1A is a perspective view of an acoustic sonar system used for measuring wave directional spectrum, wave height, and current profile, the system being mounted on a submerged moving platform. The system 100 is mounted to moving platform, such as a submarine or AUV (Autonomous Underwater Vehicle) and includes a body element containing sonar electronics and processing equipment, and a multi-transducer array 103 having the individual transducer elements arranged in the Janus configuration. This transducer array 103 generates acoustic beams 104 which are coplanar in the vertical plane 106 yet divergent from a horizontal plane 108 parallel to the surface of the fluid medium 110. The fluid medium 110 is most often natural or man-made bodies of water, especially the ocean. It should be noted that while the Janus array configuration is used in the embodiment of FIG. 1A, other array configurations which form beams having an angular relationship to the horizontal plane 108 may also be used. For example, a "pinwheel" array (e.g., one where the acoustic beams are skew-divergent from the longitudinal axis of the array), or "star" array (non-coplanar, non-skewed beams) may also be used. Additionally, phased or time-delayed arrays may be used in conjunction with the embodiments disclosed herein. As mentioned above, the system 100 may further comprise an earth reference system such as a bottom tracking ADCP, an inertial system, or a Global Positioning System (GPS) based positioning system.

As shown in FIG. 1B, the transducer array 103 may also be inverted for use with a surface or near-surface application, such as within the hull of a surface vessel 120, such that downward-projecting acoustic beams 104 are generated. In this way, WDS or current velocity at varying depths and at the bottom 110 of the fluid volume can be measured. Array altitude above the bottom (e.g., the height of the array above the local bottom), which may be different than water depth, can also be measured using this configuration.

Figure 2:
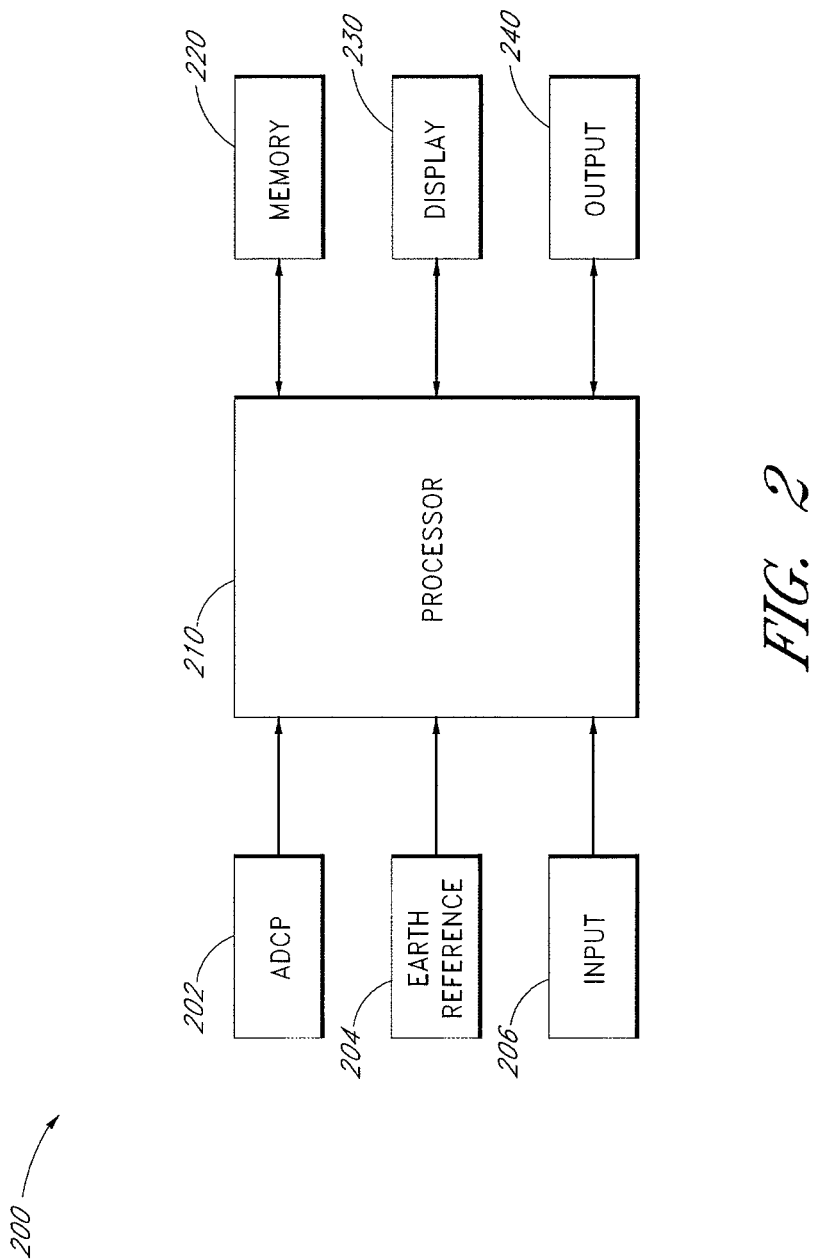
FIG. 2 is a functional block diagram of a system for determining one or more wave characteristics according to one embodiment disclosed herein.

FIG. 2 is a functional block diagram of a system according to one embodiment disclosed herein. The illustrated system 200 includes an ADCP 202 and an earth reference system 204 as inputs to a processor 210. The processor 210 can also be connected to other input devices 206 for receiving data from a user of from the environment. Suitable input devices 206 include, but are not limited to, a keyboard, buttons, keys, switches, a pointing device, a mouse, a joystick, a remote control, an infrared detector, a video camera (possibly connected with video processing software to, e.g., detect hand gestures or facial gestures), a motion detector, or a microphone (possibly connected to audio processing software to, e.g., detect voice commands). Other input devices 206, such as temperature sensors, pressure sensors, and acoustic transducers can also provide data to the processor 210.

The processor 210 can process the received data according to instructions, which may be embedded in hardware, software, firmware, stored on a computer-readable medium, or some combination thereof. The raw data, partially processed data, or fully processed data can be stored in a memory 220 of the system 200. The information can also be shown on a display 230 of the system 200 or output by another output device 240. Suitable output devices 240 include, but are not limited to, visual output devices, including displays and printers, audio output devices, including speakers, headphones, earphones, and alarms, and haptic output devices, including force-feedback game controllers and vibrating devices.

Figure 3:
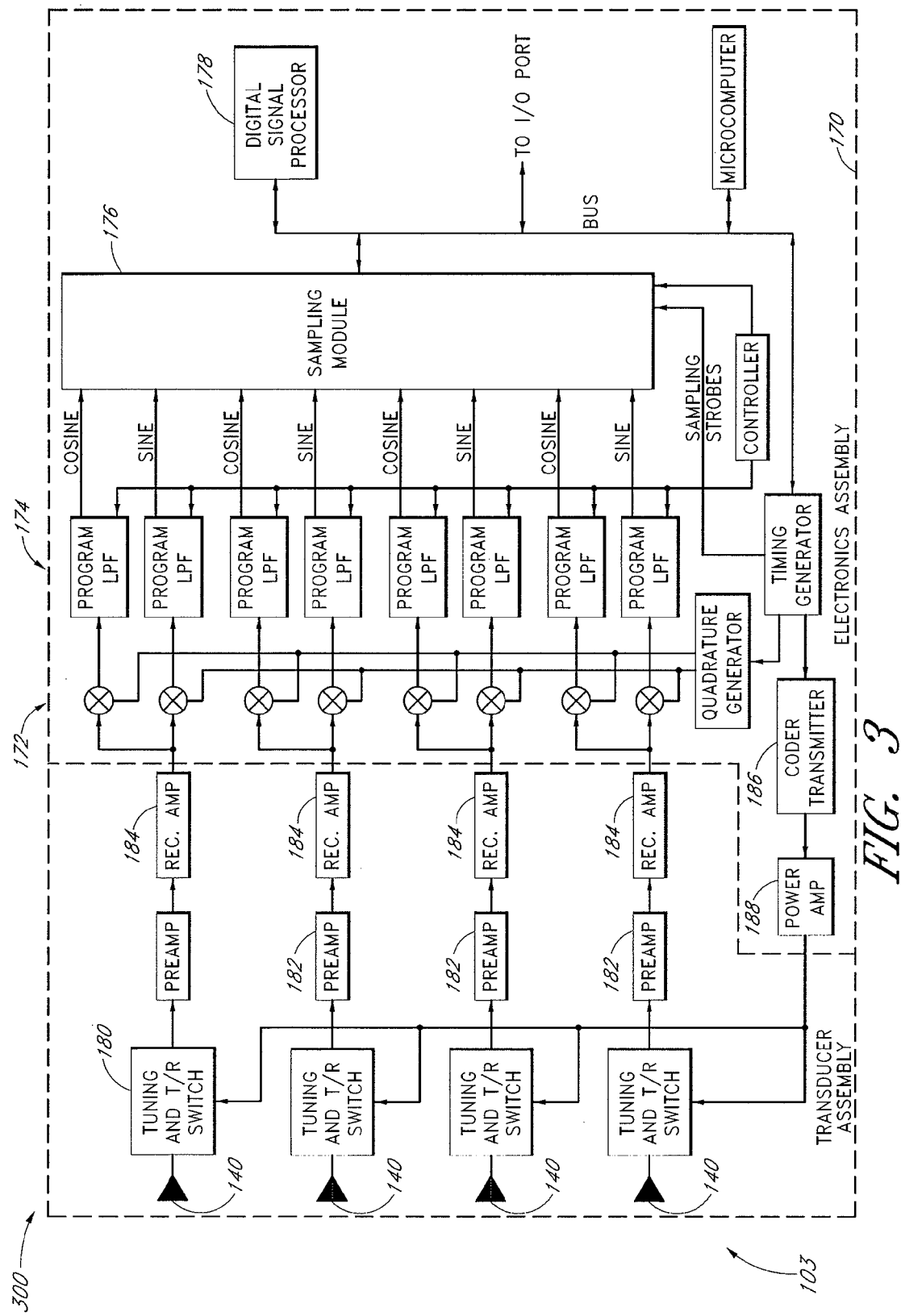
FIG. 3 is a block diagram of an exemplary embodiment of the electronics for a broadband acoustic Doppler current profiler (ADCP) of FIG. 2.

FIG. 3 illustrates an exemplary embodiment of the electronics for a broadband ADCP 300, such as a Workhorse Monitor ADCP sold by Teledyne RD Instruments, can be used in connection with any of the embodiments disclosed herein. While the following discussion may refer to an ADCP system, other models and types of sonar systems, such as narrowband Doppler systems or non-Doppler-based systems, may be used with the embodiments disclosed herein, depending on the particular application and needs of the user.

Referring again to FIG. 3, the transducer array 103 can be electrically connected to the electronics assembly 170 which can include a mixer network 172, low pass filter network 174, sampling module 176, and digital signal processor (DSP) 178. Signals generated by the transducer array elements 140 upon the receipt of acoustic signals can be fed via the transmit/receive switches 180 to preamplifiers 182 and receiver amplifiers 184, which condition and amplify the signal(s) for further processing by the electronics assembly 170. A coder transmitter 186 and power amplifier 188 can be used in conjunction with the DSP 178 to feed transmission signals to the transducer elements 140 via the transmit/receive switches 180. Thus, the same transducer elements can be used for both transmit and receive functions. Additional details regarding the exemplary broadband ADCP system are contained in U.S. Pat. No. 5,208,785, "Broadband Acoustic Doppler Current Profiler" assigned to Teledyne RD Instruments, Inc., which is incorporated herein by reference in its entirety.

An ADCP 300 mounted on a moving platform, for example, the moving platforms illustrated in FIG. 1A or 1B, can utilize an existing hole in the hull. The ADCP may be flush with the hull and not level. A fixed offset in pitch, roll and heading, relative to the platform can be addressed by entering these offsets into the ADCP and having it perform a Ship coordinate transformation. This can also be achieved with an earth transformation using the offsets and a heading of 0. The resulting output will be of the form Starboard, Forward, Mast, rather than along the ADCP beams. This may be useful in simplifying further processing.

Measuring waves and currents from a moving platform can utilize a number of reference frames and coordinate systems. Because some embodiments utilize triplet processing for waves, it is possible to combine the data across the beams using a coordinate transformation. It may be convenient to have the instrument pre-process the velocity data from beam coordinates to ship coordinates, correcting for pitch and roll offsets to the ship. The subsequent processing that occurs in this system can then assume that the profile data is already corrected for installation offsets and is in ship coordinates.

Figure 4A:
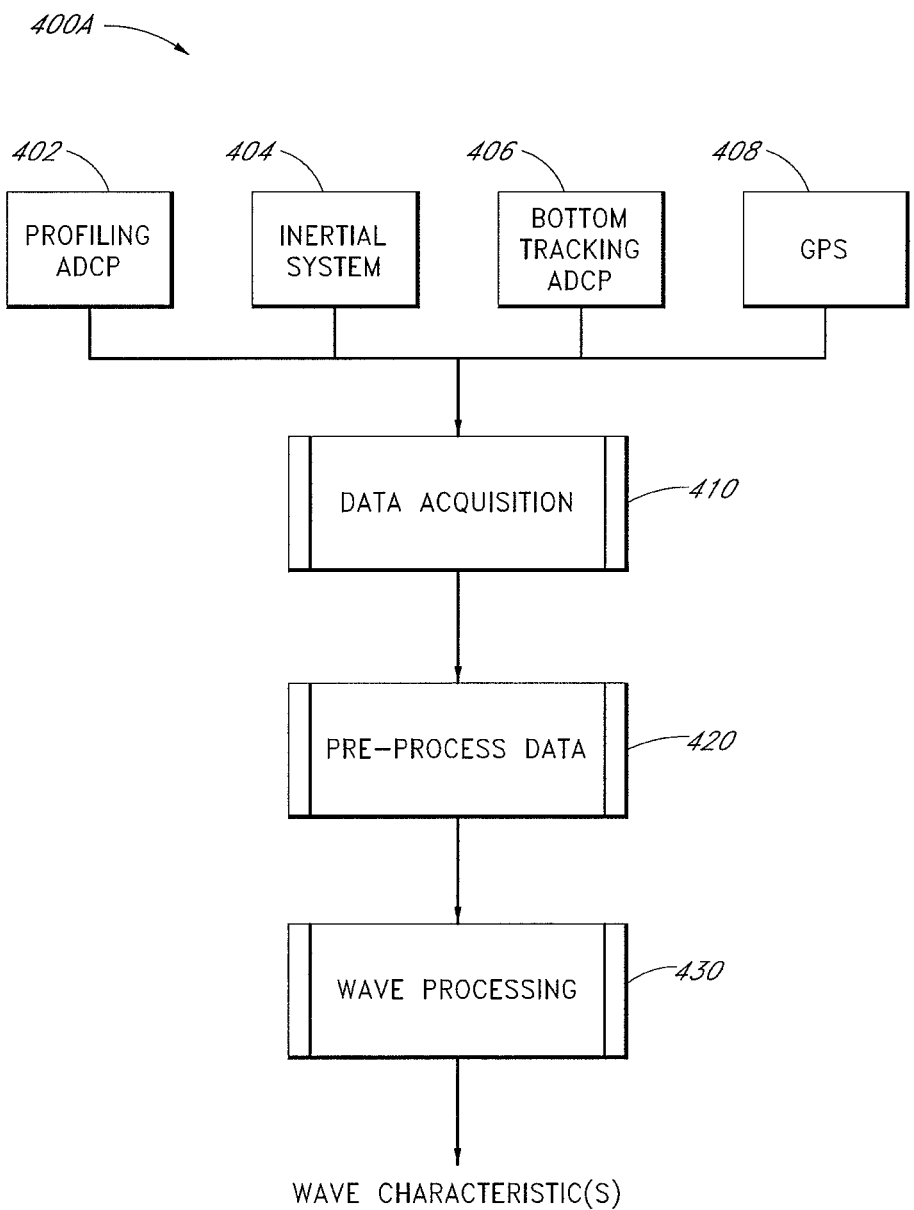
FIG. 4A is a top level process block diagram of a system for calculating at least one wave characteristic according to one embodiment.

FIG. 4A is a top level block diagram of a system 400A that can determine one or more wave characteristics according to one embodiment. The illustrated system 400A can obtain data using any combination of a profiling ADCP 402, an inertial system 404, a bottom tracking ADCP 406, and a GPS 408. The system 400A can also include a data acquisition system 410, a pre-processing system 420, and a wave processing system 430. At least a portion of one or more of the data acquisition system 410, the pre-processing system 420, and the wave processing system 430 can be implemented on a processor, for example, the processor 210 (FIG. 2).

The profiling ADCP 402 can be mounted on a moving platform, for example, the platforms illustrated in FIG. 1A or FIG. 1B. The profiling ADCP 402 can also implement any combination of the features of the ADCP 202 (FIG. 2) and/or the ADCP 300 (FIG. 3). The profiling ADCP 402 can be used to obtain data profiles of waves relative to a moving platform.

The inertial system 404 can be used as an earth reference. For example, in one embodiment, the inertial system 404 can be the earth reference system 204 (FIG. 2). An inertial system with much lesser performance than required for navigation can be used for an earth reference for wave processing. Inertial system data can be used for measuring wave frequencies even if the inertial data is subject to drift. Inertial systems can provide velocities (X, Y, Z) and orientation (H, P, R) to a wave measurement system. While inertial systems can be very precise, a common limitation of inertial systems is that they can drift with time. Schuler oscillation can often cause an offset or drift over a period of, for example, about 82 minutes. While inertial systems are subject to drift, they generally have a small scale factor error. Wave measurement is not typically influenced by the inertial drift offset as long as the scale factor is good. The magnitude of wave orbital velocities can be scaled properly but superimposed on the mean velocity and the drift error. Since the offset can be removed by FFT processing, the wave band frequencies can be left intact.

Alternatively/or additionally, the bottom tracking ADCP 406 can be used as an earth reference. For example, the bottom tracking ADCP 406 can be the earth reference system 204 (FIG. 2) in one embodiment. The bottom tracking ADCP can implement any combination of the features of the ADCP 202 (FIG. 2) and/or the ADCP 300 (FIG. 3). The bottom tracking ADCP 402 can be used to obtain data profiles of platform motion relative to the earth. This data may be asynchronous.

Alternatively or additionally, data from a GPS 408 can be used as a source of earth reference velocity. For example, the earth reference system 204 (FIG. 2) can comprise a GPS system. For a surface platform, for example, as shown in FIG. 1B, using a GPS system can be advantageous.

The data acquisition system 410 can receive data from any combination of the profiling ADCP 402, the inertial system 404, the bottom tracking ADCP 406, and the GPS 408. Additionally or alternatively, the data acquisition system 410 can receive data from any earth reference 204 (FIG. 2) and/or any input from user input device 206 (FIG. 2). In addition, the data acquisition system 410 can synchronize the received data. More detail regarding the data acquisition system 410 is provided later in connection with FIG. 5.

The pre-processing system 420 can be connected to data acquisition system 410, and thereby receive any of the data obtained by the data acquisition system 410. The pre-processing system 420 can isolate platform, water, and earth reference frames. The pre-processing system 420 can also perform one or more coordinate transformations to bring at least a portion of the received data into the same coordinate system. Lever arm corrections can also be performed by the pre-processing system 420. In addition, the pre-processing system 420 can perform wave burst accumulation. More detail regarding the pre-processing system 420 is provided later in connection with FIG. 6.

The wave processing system 430 can be connected to the pre-processing system 420 to obtain pre-processed data. The wave processing system 430 can include one or more of the following features: pre-screening data, removing platform motion, determining a directional wave spectrum, determining non-directional wave spectrum, re-scaling a wave spectrum, and determining one or more wave parameters. One or more wave characteristics can be output from the wave processing system 430. This data can be output to an electronic device, for example, the display 230 (FIG. 2). More detail regarding the wave system 430 is provided later in connection with FIG. 7.

Figure 4B:
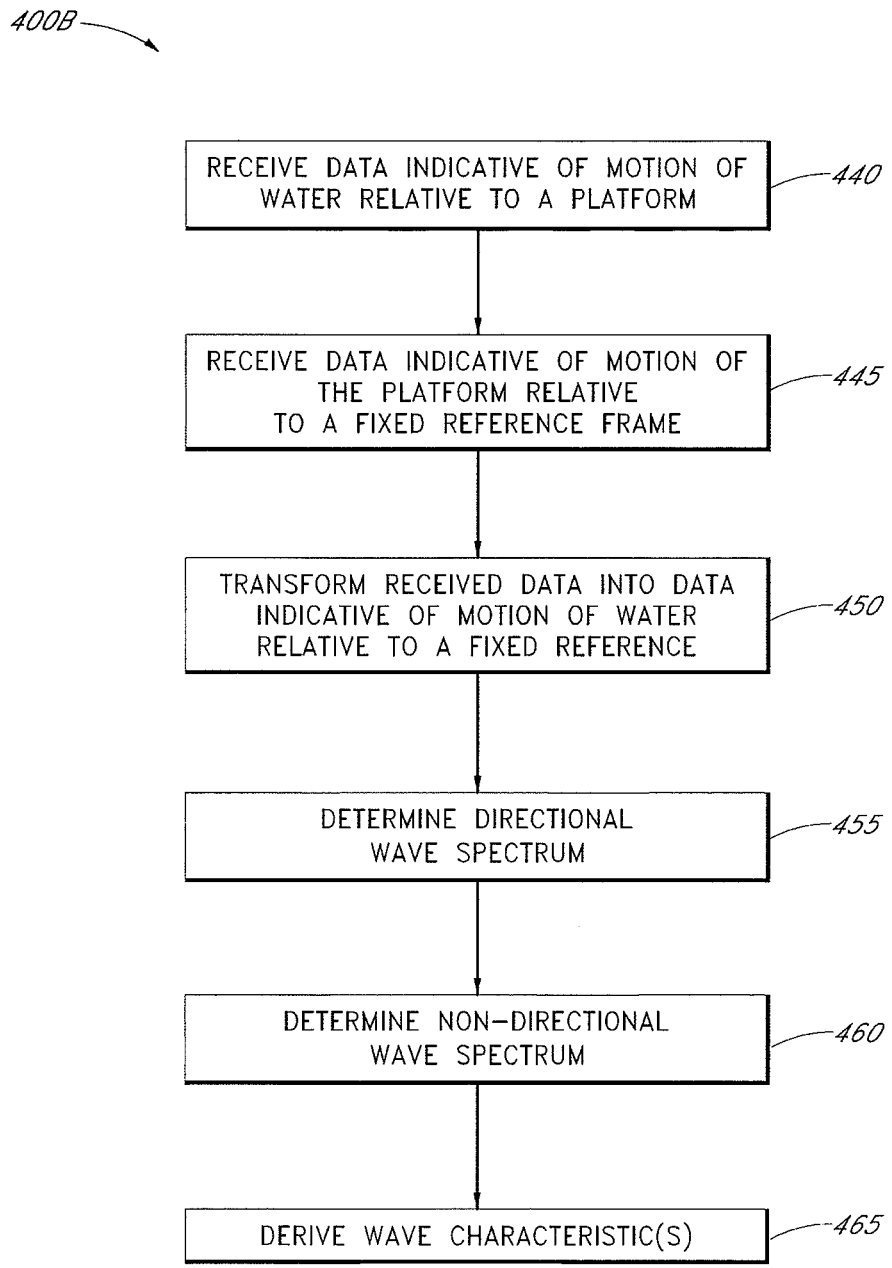
FIG. 4B is a flow diagram of a process for calculating at least one wave characteristic according to one embodiment.

Referring to FIG. 4B, a process 400B of determining one or more wave characteristics is provided. In one embodiment, the process 400B includes the following steps: receiving data indicative of motion of water relative to a platform 440; receiving data indicative of motion of the platform relative to a fixed reference frame 445; transforming received data into data indicative of motion of water relative to a fixed reference 450; determining a directional wave spectrum 455; and determining a non-directional wave spectrum 460; and deriving one or more wave characteristics 465.

Figure 5:
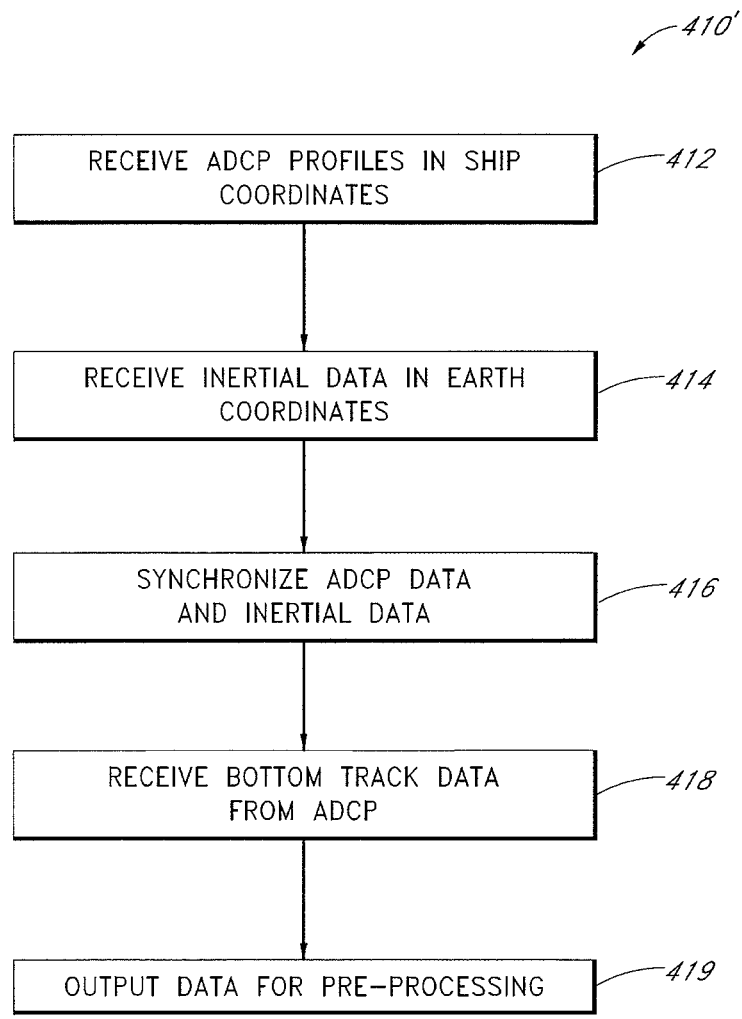
FIG. 5 illustrates an embodiment of a process for data acquisition in the system of FIG. 4.

FIG. 5 is a flow diagram of a data acquisition process 410'. The data acquisition process 410' can implement any combination of the features of the data acquisition system 410 (FIG. 4A). In one embodiment, the data acquisition process 410' includes the following steps: receiving ADCP profiles in ship coordinates 412, receiving inertial data in earth coordinates 414, synchronizing ADCP data and inertial data 416, receiving bottom track data from an ADCP 418, and outputting data for preprocessing 419.

At step 416, ADCP data can be synchronized with inertial data. For example, data from profiling ADCP 402 (FIG. 4A) can be synchronized with data from inertial system 404 (FIG. 4A). Combining platform velocity and water profile velocity in time can utilize synchronous data to the extent that timing errors are small relative to wave periods of interest. Data which are not synchronous, but are relatively synchronizable can also be used. For example, a timing latency of 1 second between the two inputs introduces a phase error of 1 second in the earth referenced combination. If wave periods of interest are between 8 to 25 seconds, then an error of 1 part in 8 can potentially be introduced. If the phase error is 4 seconds and the wave period is 8 seconds, the error could completely cancel the wave orbital. Based on this, it can be advantageous to have a timing error of less than 0.5 seconds.

Synchronization can be verified using waves. To measure the waves in the earth reference frame, we can measure the orbital velocity of the water relative to the platform, and then restore any of the wave energy that was absorbed by the platform to the water measurement. The maximum variance of the earth reference water profile marks the optimal lag between the water and platform velocity measurements because it implies we have restored all of the wave energy to the water. For example, an ADCP fixed to a neutrally buoyant platform moves exactly with the wave orbital excursion. Because the platform moves-completely with the wave, the water profile measures no velocity. All of the velocity has been absorbed into platform motion.

Embodiments disclosed herein can employ synchronous data. However, it is not always guaranteed that a common time-stamp ensures no latency. One way to empirically measure the degree of synchronization is to use the waves in the signal. In practice, the measurement noise can be very small for both the water velocity profile and the earth reference data from inertial. As such, the wave energy in both measurements may be the dominant source of variance. If we have properly restored the wave energy absorbed by the platform, back to the water profile, then the result should be a maximum. Any latency in time between the two measures will introduce phase error and will not restore all of the wave energy to the water profile. A test to determine the latency between the two measurements is to subtract the platform motion from the water profile and calculate the variance. Then, shift the data in the profile by 1 sample and repeat. By shifting 10-20 samples in each direction and calculating variance, we can find the shift which produces maximum variance and therefore the latency between the two measurements. This latency may be consistent.

Figure 6:
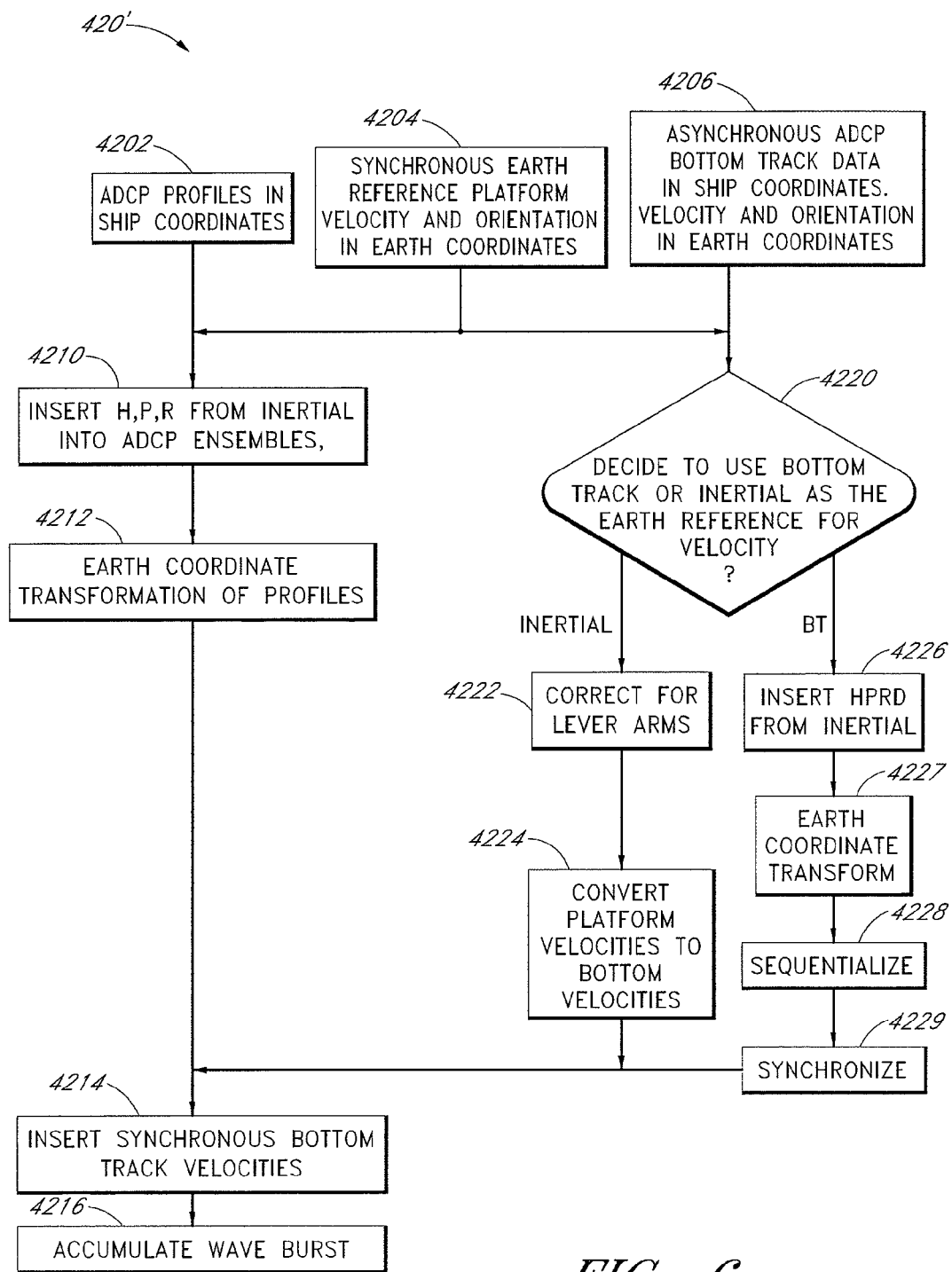
FIG. 6 illustrates an embodiment of a process for pre-processing data in the system of FIG. 4.

Referring to FIG. 6, a flow diagram of a process 420' of pre-processing data is provided according to one embodiment. The pre-processing process 420' can implement any combination of the features of the pre-processing system 420 (FIG. 4A). The data acquisition process 410' can provide the pre-processing process 420' with ADCP profiles in ship coordinates at step 4202, synchronous earth reference platform velocity and orientation in earth coordinates at step 4204, and asynchronous ADCP bottom track data in ship coordinates at step 4206. The asynchronous ADCP data can also include velocity and orientation in earth coordinates at step 4206.

At step 4210, heading, pitch, and roll, can be extracted from the inertial data and inserted into the ADCP ensemble with a synchronous time stamp. If the ADCP data is already in Ship coordinates, no translation may be necessary to apply ship attitude to the ADCP data. One may presume that the ADCP is fixed relative to the platform.

While triplet processing may introduce limitations regarding directional width and multidirectional waves, this approach can make it possible to account for many types of motion that may be difficult, or impossible, to address with more sophisticated array processing. Triplet processing presumes that you are making a measurement at a single point. By performing a coordinate transformation from beam (B1, B2, B3, B4) to instrument coordinates (U, V, W), we combine information across the beams. Although, this may discard spatial phase information about the waves, it can preserve wave direction information in the relative amplitudes of the U and V horizontal components. U and V provide information about the axis of direction. The vertical (W) component can be assumed to be out of phase with the horizontal by 90 degrees and used to resolve to or from.

Further, the Cartesian coordinate data can be transformed to earth coordinates, correcting for changes in H, P, R from sample to sample, thus moving each sample to a common orientation in the earth reference frame.

In contrast, array processing is phase coherent and utilizes spatial phase differences across a fixed array to derive much of its directional information about waves. If the array is moving, one can correct the measurement to a reference frame in which the array location is common, in order to combine data in time. To correct the data in the time domain for this type of motion, it is particularly useful to know exactly what the wave periods and directions are. In some embodiments, this is at least part of the information we are trying to ascertain. In practice, waves can be a superposition of many frequencies, at any given moment, and trying to correct for array motion can be an under constrained problem. In other embodiments, however, array processing can be used. For example, performing array processing with data in which the array is slowly drifting in circles can yield a smeared result over the entire rotation because the relative phase of the waves between array elements changes moment to moment with the array orientation.

At step 4212, the ADCP profiles can be transformed to earth coordinates. Because triplet processing can be used to determine directional spectra, one can combine velocities across the beams as if the measurement was made by a point source. One can determine if the spatial separation across the beams is small relative to wavelengths of interest before such combination. The earth coordinate transformation takes heading, pitch and roll, and applies it to ship coordinate ADCP profiles to produce earth coordinate profiles (East, North, Z, Error)

The process 420' can use attitude information from an external source, as the ADCP may be installed in an environment that does not allow the magnetic heading sensor to work. The reference velocity data for platform motion, however, can come from either a bottom tracking ADCP, an inertial system, both, or from other systems capable of tracking platform motion relative to a fixed reference. For example, the inertial reference can be used when the bottom is out of range, and the ADCP can be used when bottom track data is good. The inertial system can provide earth reference velocities always but may drift with time, affecting mean currents and Doppler shifting. The bottom tracking ADCP is a stable, unbiased source for earth reference velocity but has a limited bottom tracking range and may not be available in deep water. In other embodiments, data from any earth reference 204 (FIG. 2) and/or any input from user input device 206 (FIG. 2) can be used as a source of earth reference velocity. For example, data from a GPS system 408 (FIG. 4A) can be used in a wave processing system for a surface ship.

At step 4220, the pre-processing process 420' can decide whether to use bottom track or inertial as the earth reference for velocity. If inertial data is chosen as the earth reference at step 4220, step 4222 can correct for lever arms. Combining velocity data from ships inertial and ADCPs can be facilitated if the data is synchronous, in a common coordinate system, and referenced to the same location in space. Inertial measurement of the platform motion can be referenced to the ships inertial (centrally located). The ADCP may be located at a substantial offset from this location. Changes in pitch, roll, and heading can introduce velocities at the ADCP that are not seen at the inertial system. In order to combine ADCP and inertial data these lever arms may be addressed. This system shifts the inertial data to what would be seen at the ADCP's location. The velocities introduced can include, but are not limited to, any of the following parameters included in Table 1 below.

TABLE 1

| |
| --- |
| Vx = (ΔyΔh + ΔzΔr)/Δt |
| Vy = (ΔxΔh + ΔzΔp)/Δt |
| Vz = (ΔxΔr + ΔyΔp)/Δt |
| SR = Samplerate |
| H = heading |
| P = Pitch |
| R = Roll |
| Δx = Starboard offset from inertial to ADCP |
| Δy = Forward offset from inertial to ADCP |
| Δz = Up offset from inertial to ADCP |
| Δt = 1/SR |
| Δh = H − LastH |
| Δp = P − LastP |
| Δr = R − LastR |

After the lever arm introduced velocities are determined, they can be transformed from ship to earth coordinates so they can be added to the base inertial velocities.

In addition, the spatial offset between the ADCP and the measured water volume may not need to be corrected at step 4222. While the lever-arm between the ADCP and the bins of its profile can be large, dynamics in attitude may not introduce velocity along this lever arm. Some ADCPs only measure velocity along the beams. Changes in attitude around the ADCP center may have velocity components that are perpendicular to the beam direction and thus not measured. In other embodiments, the spatial offset between the ADCP and the measured water value can be corrected for.

After correcting for level arms, platform velocities can be converted to bottom velocities at step 4224. The inertial system can measure platform velocity relative to the earth. A bottom tracking ADCP can measure earth motion relative to the platform. While the conversion between the two reference frames may be performed by applying a negative sign to the velocities, picking a convention for this data may be beneficial to the process. In one embodiment, the convention is bottom speed, so platform motion is stored in the ADCP ensemble as bottom track data. Inertial derived platform velocities can be negated before they are stored as bottom track.

Alternatively, if bottom track is chosen as the earth reference at step 4220, different pre-processing can be performed. At step 4226, heading, pitch, roll data (HPRD) can be inserted into bottom track ADCP ensembles. In one embodiment, velocities from a bottom tracking ADCP and external source of heading, pitch, roll, for example, inertial, can provide attitude data to the system. This can be inserted into an ADCP data structure for later use. If the ADCP data is beam coordinates, the ship's attitude data can be converted to ADCP attitude. If the ADCP data is already in ship coordinates, where the heading, pitch, roll offsets relative to the ship have been accounted for in the instrument, then conversion of the attitude data may be skipped.

After inserting HPRD at step 4226, bottom track data can be transformed into earth coordinates at step 4227. However, this data may not be synchronized with the ADCP profiles in ship coordinates. When data is collected in synchronous fashion, it can be relatively simple to combine velocities from different systems. The timing associated with bottom track, however, can be frequently asynchronous because the range to the bottom changes with the environment. The profiling ADCP may always have regular ping sample timing. For example, a profiling ADCP can obtain samples once every 0.5 seconds, and the bottom tracking ADCP samples can be obtained once per 0.8 to 3.0 seconds. The first step to creating a data set from the bottom tracking ADCP, which is synchronous with the profiling ADCP, can be to place the top and bottom ADCP data in time sequential order based on Time of Validity (TOV) time stamps.

Once data is sequentialized, it can be synchronized at step 4229. To combine the top (profiling) and bottom ADCP (bottom track) data, one embodiment of the system 420 uses a bottom track velocity sample, for example, for every 2 Hz profile sample. The bottom track data can be sampled at a different sample rate and may be out of phase with the timing of the profiles. This timing issue may vary since the sample rate difference and timing offset between the two data sets can change with the environment. In one embodiment, the profile and bottom track data are first placed in sequential order at step 4229, then a bottom track sample is created at each profile sample time by interpolating from the nearest actual samples.

After initial pre-processing, synchronous bottom track velocities can be inserted into ADCP profile ensembles at step 4214. Whether the measurement of platform motion comes from inertial or ADCP, it can be put in a form that allows it to be combined with ADCP profile data. The earth reference measure of the platform motion can be corrected by one or more of the following operations before it is inserted into the ADCP bottom track structure. The earth reference measure of the platform motion can be synchronized, translated to a common coordinate system, translated for lever arms to what would be observed spatially at the location of the ADCP, and converted from the convention of platform motion to the convention of bottom motion. Once one or more of these operations have been done, the data can be inserted into the ADCP ensemble as "apples and apples."

Next, at step 4216, a wave burst can be accumulated. Waves processing may be performed in the frequency domain, and can use time series of samples accumulated over a nominal period of time, for example, 20 minutes. These time series can then passed to the wave processing as a burst of 2048 samples at 2 Hz, for example. The burst of samples to be provided to the wave processing may be substantially uninterrupted. For example, 10 minutes of data interrupted for 30 seconds later followed by another 10 minutes of data has a large discontinuity in it that may damage spectra and compromise data quality.

Figure 7:
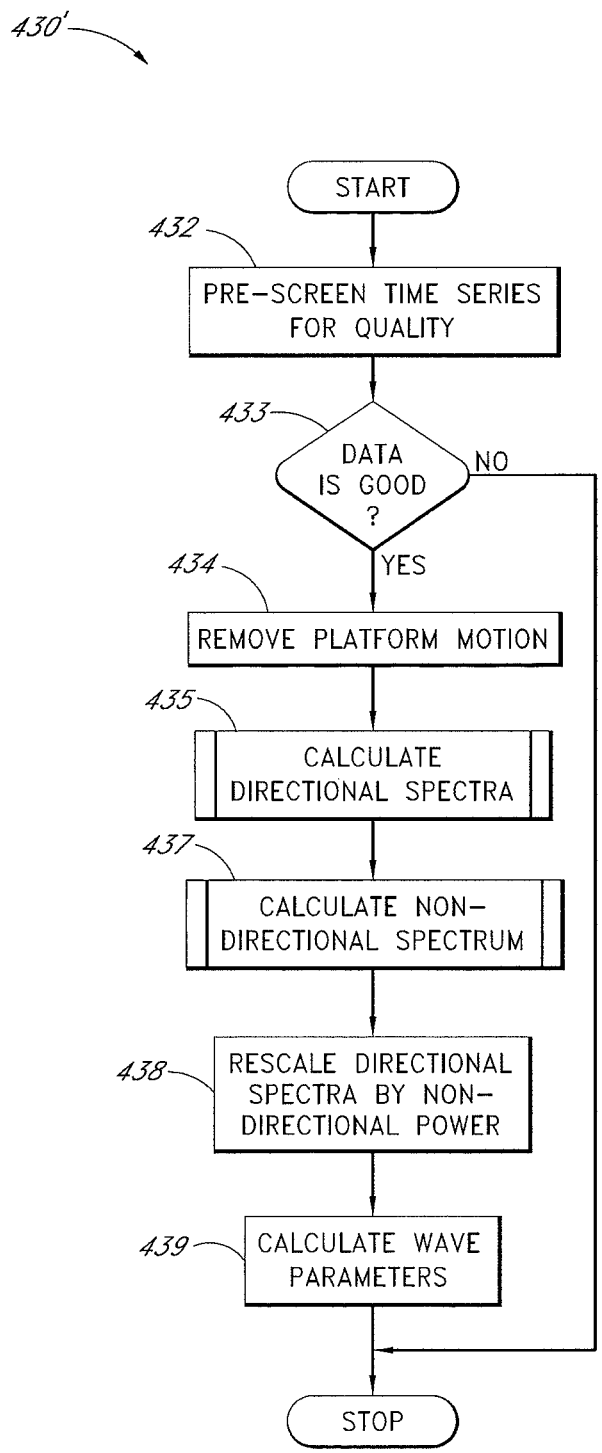
FIG. 7 illustrates an embodiment of a process for wave processing in the system of FIG. 4.

Referring to FIG. 7, a flow diagram of a wave processing process 430' is provided. The wave processing process 430' can implement any combination of the features of the wave processing system 430 (FIG. 4A). Initially, at step 432, time series velocity data can be prescreened for data quality. This process can include one or more of the following operations: identifying data that may already be marked bad coming from the instrument; iteratively removing data points that exceed 4 standard deviations from the mean; marking data points that exceed minimum and maximum thresholds as bad; determining the percentage of good data based on all flagged data; inserting interpolated data into the bad flagged data points when the percentage of good data satisfies a predetermined threshold, for example, 90%.

A data adaptive determination of an upper cutoff frequency can be advantageous in dynamic environments. There are a wide diversity of wave environments, deployment depths, and ADCP setups that can strongly influence the upper cut off frequency. In a fixed, unmoving deployment, a single upper cutoff frequency can be used. However, waves measured from a moving platform may have constantly changing altitude, depth, speed and direction. All of these parameters can strongly influence the highest usable wave frequency. A data adaptive approach that determines the highest usable frequency based on actual signal, regardless of the theoretical limits is presented below.

Wave energy can be exponentially attenuated with depth and frequency, below the surface. The ADCP measures subsurface wave orbital velocity and then software, hardware, firmware, or some combination thereof, restores this to surface displacement using linear wave theory. At greater depths and higher wave frequencies, the wave orbital velocity becomes small and falls below the instrument noise floor. At higher wave frequencies there is an observability problem where the system literally has nothing to measure. In particular, both signal (wave energy) and noise (ADCP plus environment) can vary dynamically from one deployment to the next, during deployment time scales, and burst time scales. Both Signal and Noise can also vary from one sensor (bin, beam) to the next.

In addition, many existing algorithms can perform calculations before band averaging making screening subject to wild points. Furthermore, when signal is smallest, and data quality can be lowest, the amplification back to surface displacement can be large. Moreover, in deep deployments, misplacing the upper cutoff frequency by a single frequency band too high, the resulting spectrum can potentially double the area under the spectrum, and misrepresent Hs, Tp, Dp.

For these reasons, it can be advantageous to only present good data. Making the determination of whether data is good at step 433 can include determining a data adaptive upper cutoff frequency and/or qualifying every spectral frequency.

Figure 8A:
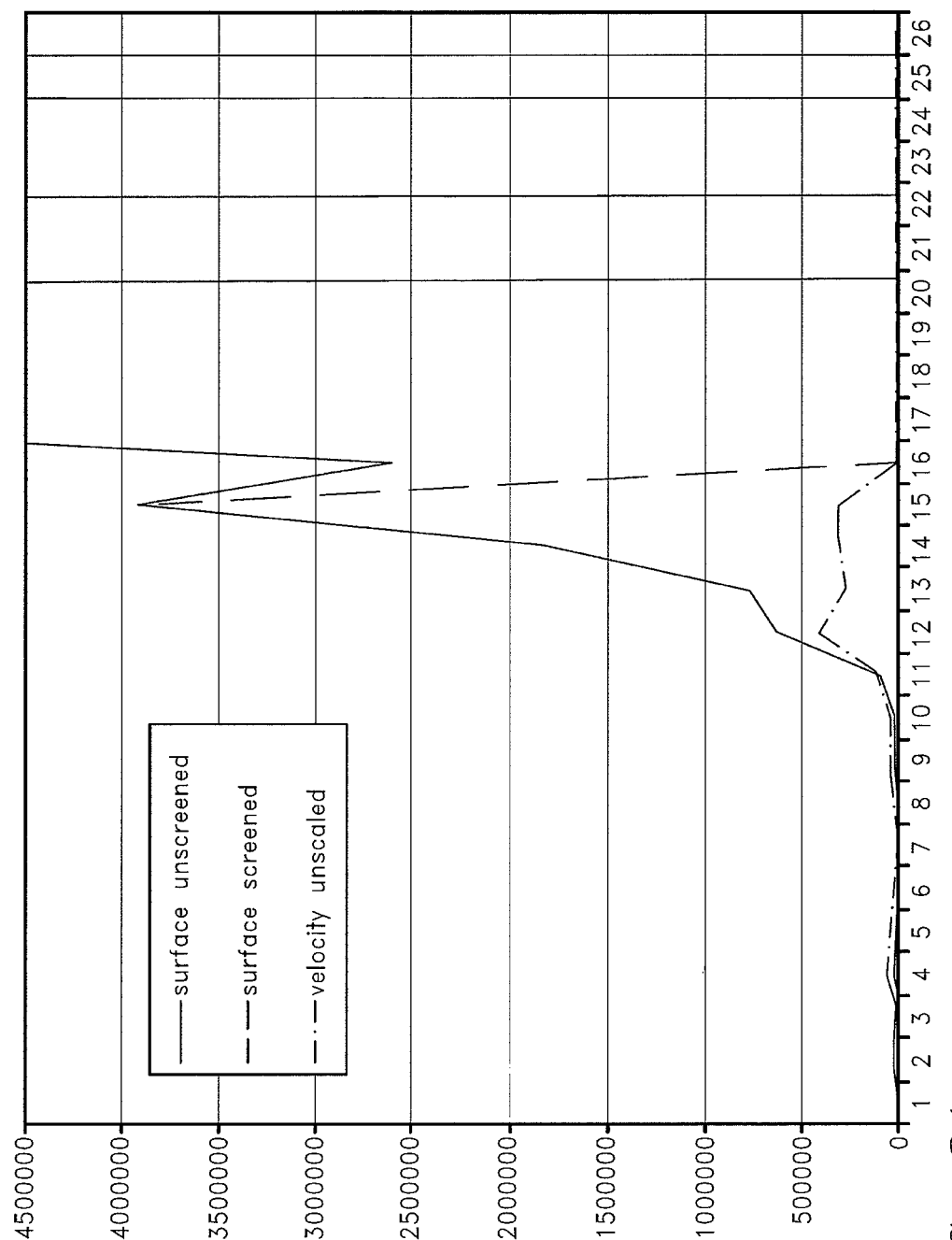
FIGS. 8A and 8B illustrate example data screened for quality in the process of FIG. 7.

One approach to determine if data is good is a data adaptive approach. FIG. 8A illustrates the relationship between frequency and spectral power in one embodiment. Because the gain, or scale factor, to translate higher frequencies to surface displacement can be large, the influence that these data points can have on the overall spectral power can be large. In one embodiment, there is a sharp pointer to quickly cut off the end of the spectrum where the noise floor may be getting amplified by this large gain. One concern is that even with upper frequencies that still have valid wave energy; variations in noise floor superimposed on them will have a significant effect on overall energy after translation. The gain times noise divided by the signal can provide a sharp pointer to last good data.

For example, in one embodiment, noise can represent 4 standard deviations (STD) of the un-translated velocity power spectrum, where STD is from 0.75 Hz to 1 Hz outside of the wave band. This can create a 99% envelope. Noise may not be frequency dependent. In this example, the signal can represent an un-translated velocity power spectrum at each frequency. In this example, the gain can represent an averaged translation to surface displacement. Band averaging early in the process can allow this kind of screening and process to occur without wild points. Preserving a collective (e.g., least squares) un-translated velocity spectrum allows screening to occur before amplification on source data. When the gain is at a large end of the spectrum, it can be desirable to have a conservative signal to noise ratio. A large gain can be undesirable to apply without having a high quality, unambiguous input spectrum.

Figure 8B:
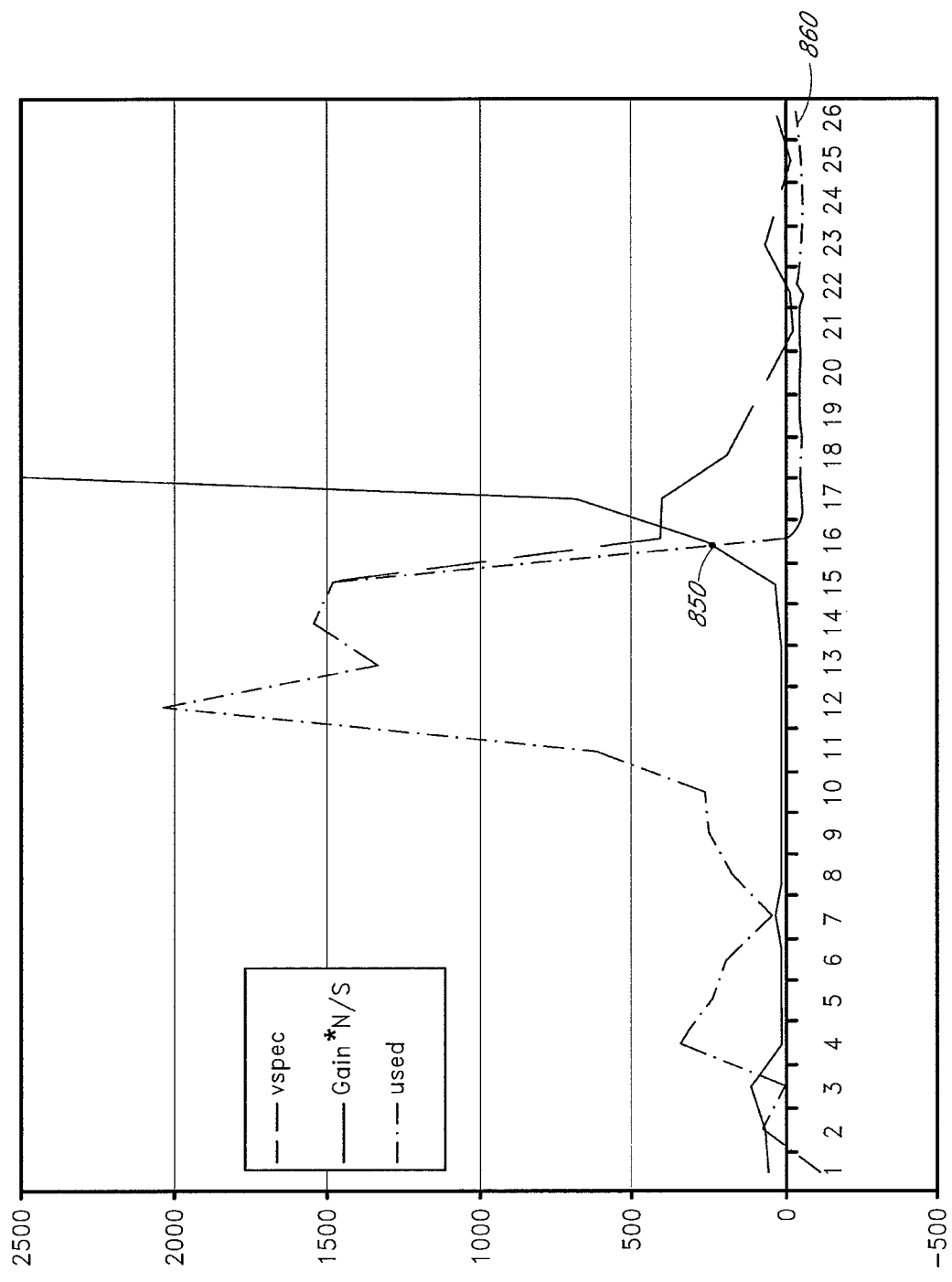

When gain times noise divided by the signal (GN/S) grows larger than some threshold, for example, 100, this can represent the upper cutoff. As shown in FIG. 8B, the velocity spectrum can be discarded when GN/S exceeds a threshold at point 850. When GN/S exceeds the threshold at point 850, the spectrum used can be close to zero at portion 860 of the curve representing the spectrum used. Once the upper cutoff is obtained, data can be screened for signal to noise ratios that satisfy the cutoff. This two stage approach may allow for the robust handling of bimodal spectra. If two peaks exist, the upper cut-off can be set above the second peak because the signal to noise is still valid at these frequencies. Data between the peaks that contains no real power can be screened by the 4 sigma requirement.

GN/S can advantageously be used for a number of reasons. One object of this equation is to create a sharp pointer to the very last viable frequency band in any given wave power spectrum. The danger is that we amplify noise floor at the end of the velocity spectrum by the potentially large gain (G) to get surface displacement. Under some conditions even a single frequency band too high can substantially falsify the area under the power spectrum. It stands to reason that we want to ensure a good signal to noise ratio before we consider amplifying the data or using it to determine direction. So we first introduce the terms Noise/Signal where Noise is 4-6 times the standard deviation of the actual power spectrum where no signal exists. Signal is the power in the spectrum at each frequency band. These criteria can isolate frequency bands that unambiguously have real wave power that stands out above the measurement noise floor. Additional processing may be required to determine an upper cutoff frequency. To do this we multiply the N/S By Gain where the gain is the amplification to surface displacement. This is reasonable because the greater the gain is the more important it is that we do not falsely amplify noise. When the depth is great, G will be large (steep exponential with frequency) and the rate at which G*N/S climbs will also be steep. So the pointer becomes more conservative when it is reasonable for it to do so. When G*N/S is greater than some threshold, stop at this frequency.

Four sigma (standard deviations) can generally be a good envelope around the noise of measurement. This value can be set to a more conservative 6 sigma or any other value, depending on a particular application. There are at least 2 reasons to screen data for good signal to noise ratio. One reason is to require that data have good signal to noise ratio before amplifying it to surface displacement. Another reason is to require that data have good signal to noise ratio before using it for directional waves.

Four sigma can be a good measure when used with vertical systems to avoid amplifying noise floor at the end of the spectrum. With horizontal systems, a more conservative criterion (e.g., 6 sigma) may be used to get robust directional waves. This may be associated with the fact that the response, (and therefore noise threshold) for a horizontal system is anisotropic. It may also have to do with array motion that is common for systems used in offshore applications.

Referring back to FIG. 7, if the data is determined to be bad at step 433, the wave processing process 430' can stop. Alternatively, if the data is determined to be good at step 433, the data platform motion can be removed from good data at step 434. In some embodiments, in the processing up to this point, the platform motion may be converted to a like measurement (same coordinate system, conventions, timing, location, etc.), but the platform motion, e.g., bottom track, and the profile may be kept separate. In such an embodiment, the platform motion can then be subtracted from the profile in order to restore any wave energy that induced platform motion, back to the water velocity profile. This step can restore the water velocity profiles to the earth reference frame in regards to platform dynamics. While this step restores all of the wave period motion to the water profile, it may not correct for the Doppler shift of wave frequencies, associated with the mean forward motion.

There are a number of factors that can influence the measurement of waves from a moving platform. Such factors can include without limitation platform speed, platform direction, wave frequency, wave direction, platform response, platform altitude, platform depth, and mean currents. Most of these factors are frequency dependent. For example, if the depth changes during the course of a 20-minute wave sampling interval, from 20 m to 40 m, inaccuracies may result from using the average depth when spectra are translated to surface displacement. Depth can strongly and non-linearly effect the translation to surface displacement with frequency.

Removing platform motion at step 434 can also include correcting for motion on different time scales. This can include one or more of the following actions:

A. Restoring any wave energy absorbed by the platform back to the platform relative water velocity measurements.

B. Using an earth coordinate transformation on the profile velocity data to account for dynamics with heading, pitch, and roll on a single sample basis. This may be used to correct measurements to the earth reference frame (East, North, Z) so they can be efficiently combined into time series.

C. Correcting for the Doppler shift of wave frequency in the observed reference frame and correcting for Doppler shift of wave number by earth relative currents.

D. Applying frequency dependent parameters such as speed, depth, and direction to each wave frequency band, on a short time scale.

E. Once short time scale spectra have been individually calculated and corrected for motion, they can be averaged to produce a single statistically quieter result and wave parameters can be determined on this time scale.

F. Sliding a 17 minute long window through the data 5 minutes at a time allows for 5 minute updates containing the last 17 minutes of data.

TABLE 2

| Time Scale | 0.5 seconds | 2 minutes | 17 minutes | 20+ minutes |
|---|---|---|---|---|
| Actions | A, B | C, D | E | F |

Table 2 provides exemplary time scales to illustrate the relative size of the time scales which may be considered in one embodiment. One of ordinary skill in the art will appreciate that other time scales may be employed.

Other time scale challenges can include:

1. Motion on time scales of waves (e.g., <30 seconds) can be corrected to a common frame of reference for each and every sample.

2. Wave propagation and attenuation with depth may be strongly frequency dependent, so inaccuracies may result from combining data into a single time series that is measured from an environment that is dynamically changing. The frequency dependent parameters affecting waves may be reasonably stable during the sampling interval.

3. It can be desirable to take a short time frame and perform wave processing on it so that dynamics can be applied to each segment accordingly.

4. Wave periods of interest are, e.g., 5-30 seconds. A 0.5 Hz sample rate can bound the shortest reasonable sampling interval.

5. To address medium (e.g., <2 minutes) time scale dynamics (changes in mean speed, direction, depth), the shortest time series that can still statistically produce spectra with adequate resolution and variance can be about 2-2.5 minutes.

6. While medium times scale segments can be individually corrected they may still be statistically noisy. This effect can be lessened by averaging the segments after correction.

Removing platform motion can also be independent of the platform response function. The platform can respond to the waves in any fashion (delayed, wavy, Brownian motion, no motion at all, etc.). With synchronous measurements of the platform relative water velocity, and earth relative platform velocity, we can restore the absorbed platform motion to the water profile, independent of what the response function might be. In other embodiments, the measurements may not be synchronous, but can be delayed by a known factor. This known factor may also be dynamic. In other embodiments, the measurements are not exactly synchronous, but vary to the extent that timing errors are small relative to wave periods of interest.

Platform motion can be removed in the time domain. Removing platform motion in the time domain can provide advantages compared to removing platform motion in the frequency domain. Embodiments of the invention operate on power spectra, because averaging frequency spectra (complex with phase information) may converge to 0 as the phase differences cancel each other out. If we are accumulating power spectra, the result can be different by the cross terms than a time domain accumulation. For example, $(A+B)^2 \neq (A^2+B^2)$.

After removing platform motion at step 434, directional spectra can be calculated at step 435. The directional spectra calculation can begin, for example, by averaging a 2 m volume of water into 20 minute time series of East, North, and Z velocities. Overlap-add techniques can be used to split up the data into shorter pieces. Cross spectra can be calculated for each segment and then coefficients by the triplet approach. A remapping of coefficients in frequency space (for Doppler shift) can be performed using peak direction, for each time segment. Remapped coefficients at each segment can then be averaged over the burst interval to produce a quieter directional estimates More detail related to calculating directional spectra is provided later in connection with FIGS. 9A and 9B.

Then the non-directional spectrum can be calculated at step 437. More detail regarding calculating the non-directional spectrum is provided later in connection with FIGS. 13A and 13B.

Although the directional or non-directional spectrum can be calculated simultaneously or in any order, a particular order of calculation can provide certain advantages. The calculation of direction wave spectra and non-directional power spectra can be performed independently where each problem is easier to resolve with fewer dimensions to be constrained. However, in some embodiments, dependencies may exist between the two algorithms. For example, to determine the non-directional power spectrum P(f), one can correct for the Doppler shifts associated with forward motion and mean currents. This can involve knowledge of the peak wave direction at each frequency in observed frequency space. As another example, to determine a full frequency-direction spectrum $D(f,\theta)$, we can use information about both wave direction and power at each frequency in the earth reference frame.

Advantageously, the following order of operations can be implemented. A normalized wave directional distribution $D_{norm}(f_{obs},\theta)$ can be calculated at each observed frequency. The peak direction $D_{peak}(f_{obs})$ at each observed frequency can be obtained and preserved for later processing. The normalized directional distributions $D_{norm}(f_{earth},\theta)$ can be mapped from observed frequency space to earth frequency space, based on peak direction, and stored for later processing. The non-direction power spectrum $P_{obs}(f_{obs})$ can be calculated in the observed frequency space. The observed peak directions $P(f_{earth})$ calculated previously can be applied to remapping non-direction power spectrum to earth reference frequency space. The normalized, remapped, directional distributions $D(f_{earth},\theta)$ can be scaled by the similarly remapped non-directional power, at each frequency. However, any order or combination of these steps can be implemented to realize the advantages of data dependencies.

Referring back to FIG. 7, at step 438 the directional spectra can be rescaled by the non-directional power. This can normalize the directional and non-directional spectra for calculating wave parameters. Alternatively or additionally, the non-directional spectra can be scaled by the directional spectra. And, in some embodiments, no rescaling may be needed at all.

At step 439, wave parameters or characteristics can be calculated from the directional spectra and/or the non-directional spectra. Wave parameters or characteristics, including without limitation significant wave height, peak period, peak direction, wave orbital velocity, and/or wave orbital excursion, can be calculated from these spectra using well known techniques.

For example, significant wave height, Hs, can be calculated from a power spectrum. The area under the power spectrum between the lower and upper cutoff frequencies can be accumulated. In one embodiment, the significant wave height can be represented by four times the square-root of the area under the power spectrum normalized by the width of the frequency bands, as shown by the equation below. This can be the equivalent of 4 standard deviations in time domain analysis and can be the approximate equivalent of H1/3.

$$Hs = 4.0 * \sqrt{(\Sigma P(i) * \text{delta} f)} \quad (1)$$

As another example, the peak frequency, Tp, can be determined by searching the valid region of the non-directional wave height spectrum for the largest value. Once this peak is found, the peak period can be represented by the inverse of the peak frequency, as shown in the following equation.

$$Tp=1.0/fp=1.0/(\max(f)) \quad (2)$$

Interpreting or comparing peak period data can be tricky because it can be common for there to be two peaks in a spectrum of approximately the same height. When this occurs, the peak period may fluctuate between the two values. This can be an accurate representation of the environment.

As another example, peak direction, Dp, can be determined by finding the peak of the directional distribution at the peak period. If the resolution is less than 1 degree, the peak direction can be interpolated to get better resolution. Peak direction can be represented by the following equation.

$$Dp=\max(D(\theta,fp)) \text{ where } fp \text{ represents peak frequency} \quad (3)$$

Figure 9A:
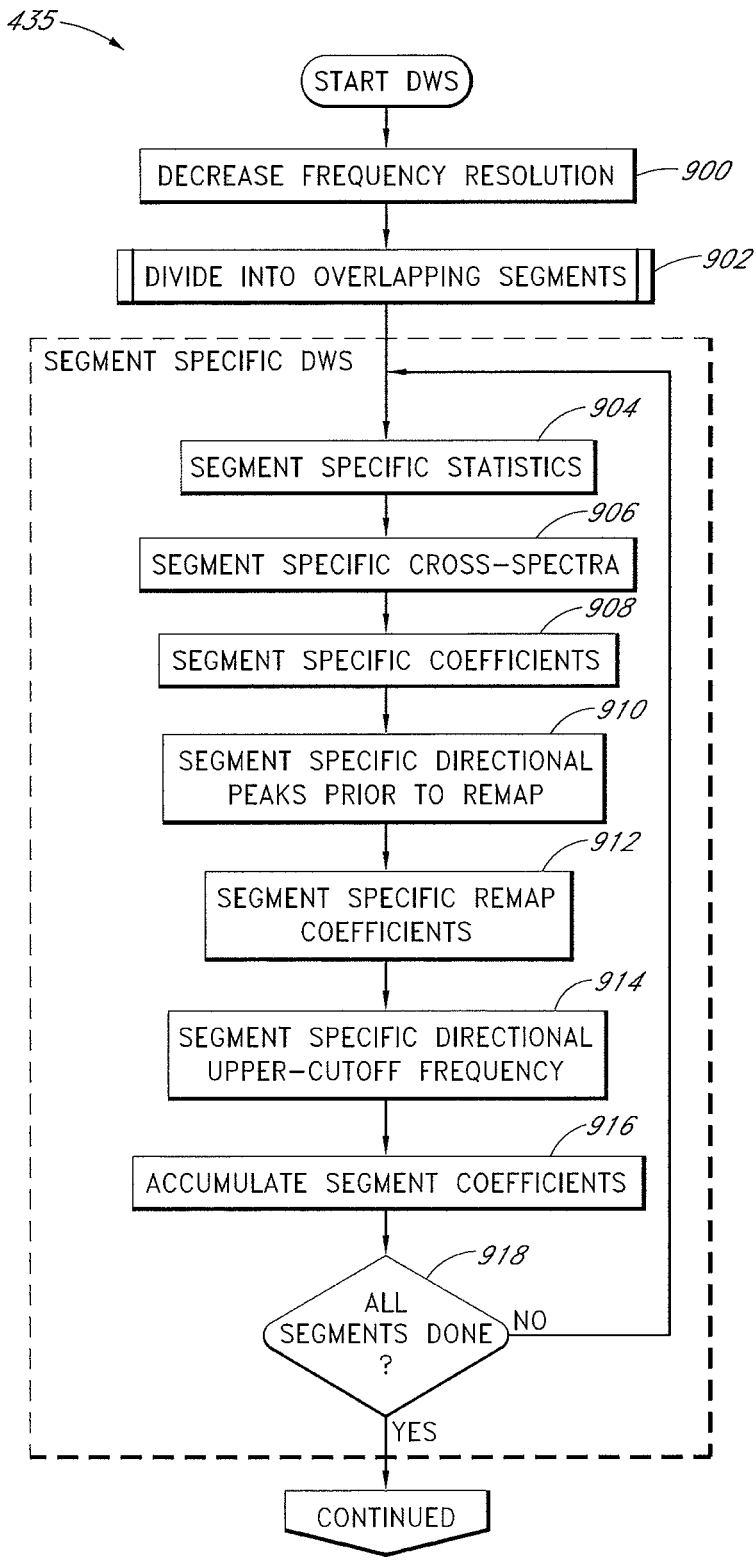
FIGS. 9A and 9B illustrate an embodiment of a process of calculating a directional wave spectrum in the process of FIG. 7.
Figure 9A:
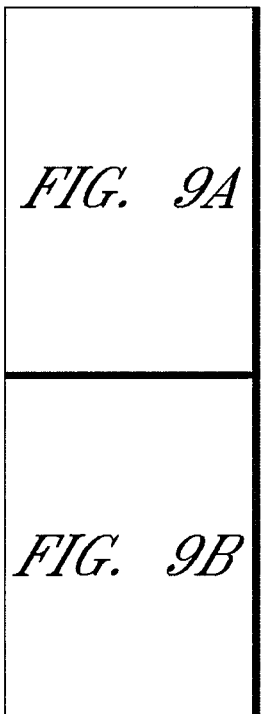
Figure 9B:
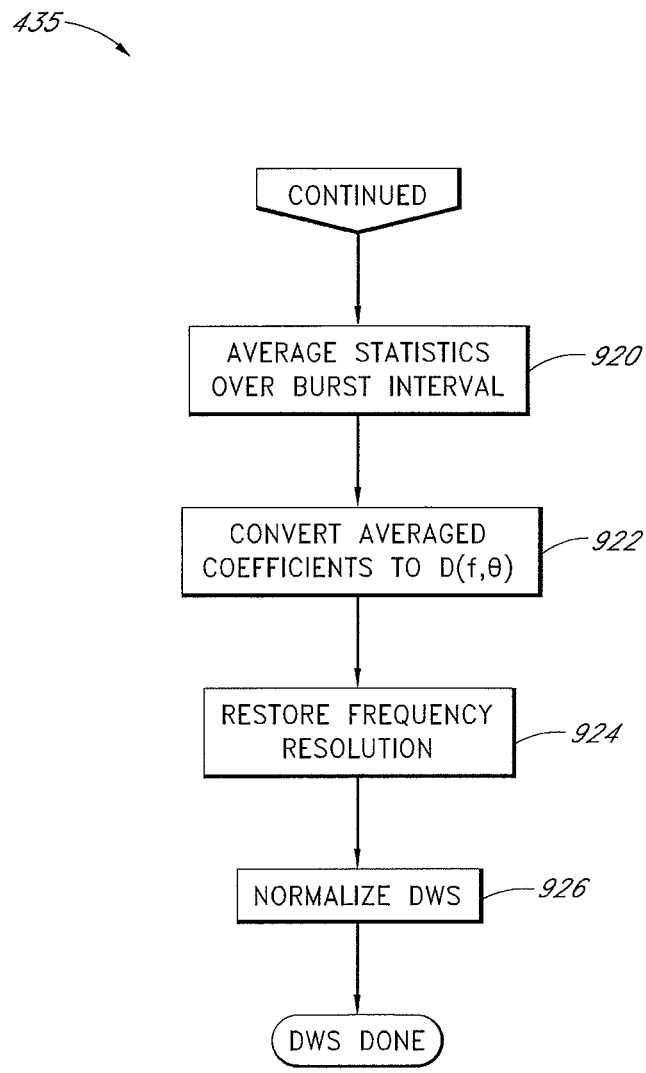

FIGS. 9A and 9B illustrate a flow diagram of a process 435 for calculating a directional wave spectrum (DWS). The process 435 provides more detail regarding step 435 of FIG. 7. At step 900, the process 435 begins by decreasing the frequency resolution. To improve the variance and stability of directional estimates derived from relatively short time series, the frequency resolution of the directional spectrum can be decreased. This can increase the degrees of freedom for each estimate, at the possible expense of frequency resolution. This may be a reasonable tradeoff since wave direction tends to group and the quietness of the directional estimate can strongly influence the remapping process later. Non-directional spectrum may be desired in higher resolution because the wave height may be strongly dependent on the accuracy of remapping frequency space for Doppler shift. For example, a non-directional spectrum can be calculated with 15 overlapping, 256 sample segments spanning 2 minutes each, providing 128 frequency bands from 0 to 1 Hz. For example, the directional algorithm can be calculated with 31 overlapping, 128 sample segments spanning at least 2 minutes each, providing 128 frequency bands from 0 to 1 Hz.

Figure 10:
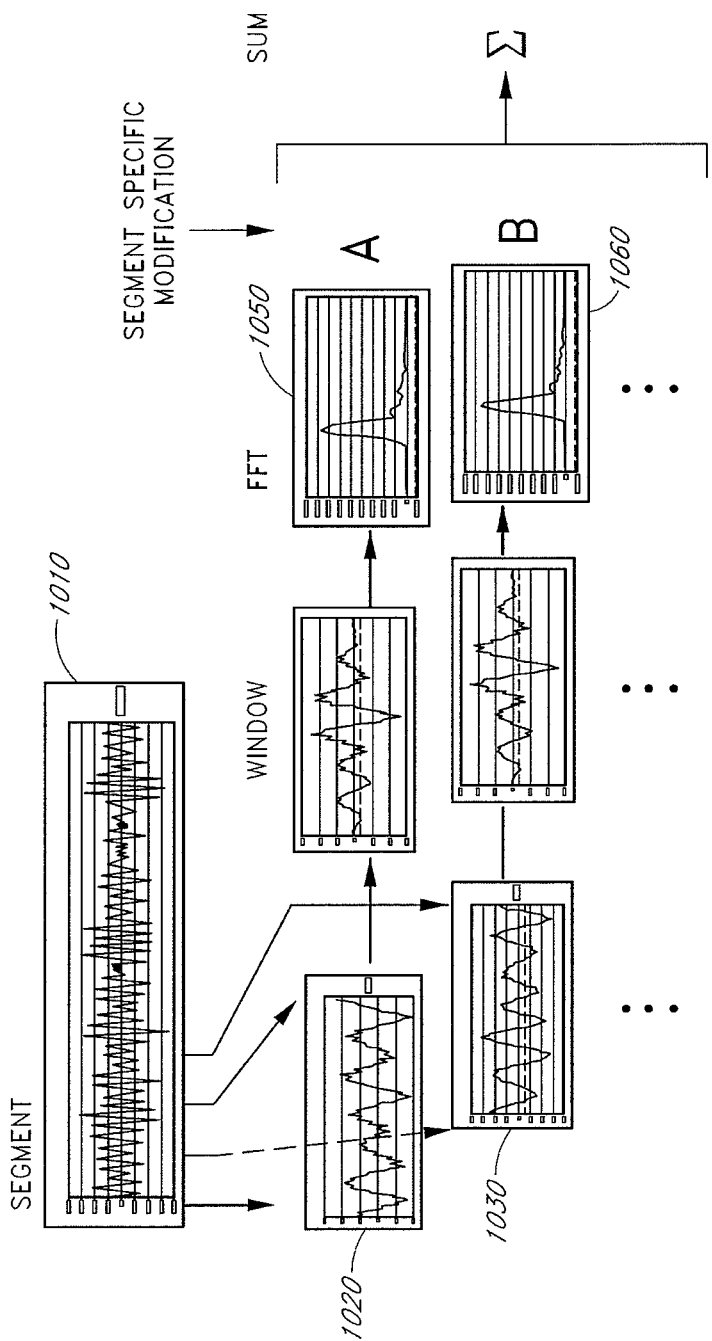
FIG. 10 illustrates a process of dividing time series data into overlapping segments in the process of FIGS. 9A and 9B.

At step 902, the process 435 can divide time series data into overlapping segments. As illustrated in FIG. 10, overlap-add spectral processing can splits up a segment 1010 of time series data (e.g., 2048 samples) into a number of overlapping segments 1020, 1030. Each segment can be Fourier transformed to the frequency domain, and then the resulting spectra 1050, 1060 can be averaged. This approach can apply frequency dependent parameters, such as depth and speed, to each segment spectrum before they are averaged.

The discrete Fourier transform can be sensitive to the end points (an infinitely long time series typically does not have problems), and windowing can be used on smaller segments. The overlap-add approach can mitigate the effects of end points by windowing each individual segment to attenuate the data near the ends. Windowing reduces the effective number of independent samples in each segment. Overlapping segments can restore the degrees of freedom lost to windowing.

Overlap-add processing can be used instead of band averaging. Band averaging can involve performing a single large Fast Fourier Transform (FFT) (e.g., 2048 samples) then average adjacent frequency bands to produce a spectrum with less resolution but improved variance. Overlap-add processing can be desirable when a non-linear process is performed on the spectrum that is improved by more degrees of freedom. However, in other embodiments, band averaging can be used instead of overlap-add processing.

The overlap-add approach can be used for processing waves in a dynamic environment because it can be desirable to divide up the time-series into smaller segments anyway in order to address changes in frequency dependent parameters on a shorter time scale. If changes in speed, direction or depth happen slowly then the mean value for each 2 minute segment will be representative of that time frame. If the changes happen suddenly the approach can still work for practical purposes if such changes are infrequent. For example, a platform is traveling into the waves for 10 minutes then turns 180 degrees and travels with the waves for 10 minute and 20 minutes of data is processed using overlap-add. The data segments from the out going trip are processed and the spectra are corrected for the Doppler shift induced by moving into the waves. Likewise, the segments of the return trip are processed correcting for Doppler shift induced by moving with the waves. The segment of data that straddles the turn may not be of high quality because it incorrectly combines data with both Doppler shifts. The erroneous segment is one 2 minute segment out of 20 minutes of data so its contribution is small as long as the rest of the segments are correct.

Referring back to FIG. 9A, the overlapping segments 1020, 1030 (FIG. 10) generated in step 902 can each be processes separately. At step 904, segment specific statistics can be computed. In one embodiment statistics, such as the mean, median, mode, variance and/or standard deviation, for all of the frequency dependent parameters are accumulated for each segment, including, but not limited to, depth, altitude, platform speed, platform direction, current speed, and current direction. In another embodiment, at least one statistic can be calculated for one or more of the frequency dependent parameters. Each segment can be individually modified using a statistic representative of an average values, such as the mean value, of these parameters. A statistic representative of variability, such as the standard deviation, can be used to determine if the average value is representative. For example, a platform moves at a depth of 100 meters for 5 minutes then rises to a depth of 10 meters for 5 minutes. The mean depth is 55 meters, however, because the frequency dependent attenuation of wave energy with depth is strongly non-linear, the segment should not be used.

Segment specific cross-spectra can be determined at step 906. A cross spectra can be calculated from each windowed segment. A FFT can be performed on each triplet. The triplets and their respective FFTs can be represented by the following expressions.

$$u(t)=\text{East velocity}, U(f)=FFT(u(t)) \quad (4)$$

$$v(t)=\text{North velocity}, V(f)=FFT(v(t)) \quad (5)$$

$$w(t)=-Z \text{ velocity}, W(f)=FFT(w(t)) \quad (6)$$

Then the cross spectra can be:

$$C_{uu}=\hat{U}^2 \quad (7)$$

$$C_{vv}=\hat{V}^2 \quad (8)$$

$$C_{ww}=\hat{W}^2 \quad (9)$$

$$C_{uv}=\hat{U}\hat{V} \quad (10)$$

$$C_{uw}=\hat{U}\hat{W} \quad (11)$$

$$C_{vw}=\hat{V}\hat{W} \quad (12)$$

After the segment specific cross spectra are computed, segment specific triplet coefficients can be determined at step 908. These can be, for example, the first three or the first five, coefficients of the Fourier series representing wave direction.

The directional information in only 3 terms represented by 5 coefficients can be limited. While these coefficients are limited, they can contain substantially all of the directional information available. It can be convenient to represent the directional distribution in terms of these coefficients D(f, coeffs), rather than θ. When directional distributions are averaged, they can be averaged as coefficients. This can simplify the overlap-add approach by allowing us to calculate a set of coefficients for each overlapping segment in a data series. These coefficients can be averaged rather than full directional distributions.

One embodiment of triplet processing can represent the wave directional distribution, at each frequency, with the first 5 coefficients of a Fourier series. The coefficients can be represented by the following equations:

$$A_0(f) = C_{ww}(f) \cdot r \tag{13}$$

$$A_1(f) = C_{uw}(f) \cdot i / \sqrt{C_{ww}(f) \cdot r \times (C_{uu}(f) \cdot r + C_{vv}(f) \cdot r)} \tag{14}$$

$$B_1(f) = C_{vw}(f) \cdot i / \sqrt{C_{ww}(f) \cdot r \times (C_{uu}(f) \cdot r + C_{vv}(f) \cdot r)} \tag{15}$$

$$A_2(f) = (C_{uu}(f) \cdot r - C_{vv}(f) \cdot r) / (C_{uu}(f) \cdot r + C_{vv}(f) \cdot r) \tag{16}$$

$$B_2(f) = (2.0 \times C_{uv}(f) \cdot r) / (C_{uu}(f) \cdot r + C_{vv}(f) \cdot r) \tag{17}$$

Limitations of triplet processing include the fact that waves from multiple directions at the same frequency cannot typically be represented unless the directions are widely separated. Additionally, the directional width is mostly undetermined by 5 coefficients. Knowing that coefficients can substantially provide information about peak direction only and may not be able to produce directional width accurately can be significant. Based on this knowledge, one can simply pick a somewhat realistic directional width that graphically communicates the peak direction easily. For example, a 10-degree wide Gaussian can be chosen because it is wide enough to see the peak direction clearly on a contour plot, and small enough to show directional trends with frequency.

At step 910, segment specific directional peaks can be identified prior to remapping the frequency space. The peak direction at each observed frequency can be determined by finding the maximum of the directional distribution represented by the coefficients. This can be used later to remap frequency space for Doppler shift. The following equations can be used to determine the peak direction.

$$D(f,\theta) = A_0(f) + A_1(f)\cos(\theta) + B_1(f)\sin(\theta) + A_2(f)\cos(2\theta) + B_2(f)\sin(2\theta) \tag{18}$$

$$D_{peak}(f) = \operatorname{Max}_\theta[D(f,\theta)] \tag{19}$$

The map of peak direction can be aligned in time for use by the non-directional spectrum algorithm. In some embodiments, the directional algorithm can use less resolution than the non-directional algorithm by a factor of, for example, 2 or 4. This may minimize the top error sources to the remapping process that restores Doppler shifted spectra to the earth reference frame. In order to get the benefit of both quiet directional estimates θ and adequate non-directional resolution, we can optimize the segment size and the frequency banding for each process. The non-directional algorithm, however, may depend upon the map of peak directions at each frequency band that is derived from the directional spectra algorithm. In order to support this dependency, one can interpolate the map of peak directions for each segment to the frequency resolution of the non-directional spectrum. In some embodiments, there may be a different number of segments in each algorithm that lineup in time differently. To address this challenge, the map of peak directions for each directional segment can be re-aligned so that there is a peak direction estimate based on the time frames of each of the segments in the non-directional algorithm.

At step 914 segment specific remapping of coefficients can be performed. This can redistribute the coefficients representing direction in frequency space to correct for Doppler shift in observed frequency space. At this step, the peak directions can be smoothed by the extra averaging (decreased resolution can lead to wider frequency bands) and has the same resolution as the coefficients. The entire directional distribution may not be used to remap frequency space; in some embodiments, only the peak direction may be used. This process can be repeated for each observed frequency. An example mapping of the frequency space that can be repeated for each frequency is provided in FIG. 11.

Figure 11:
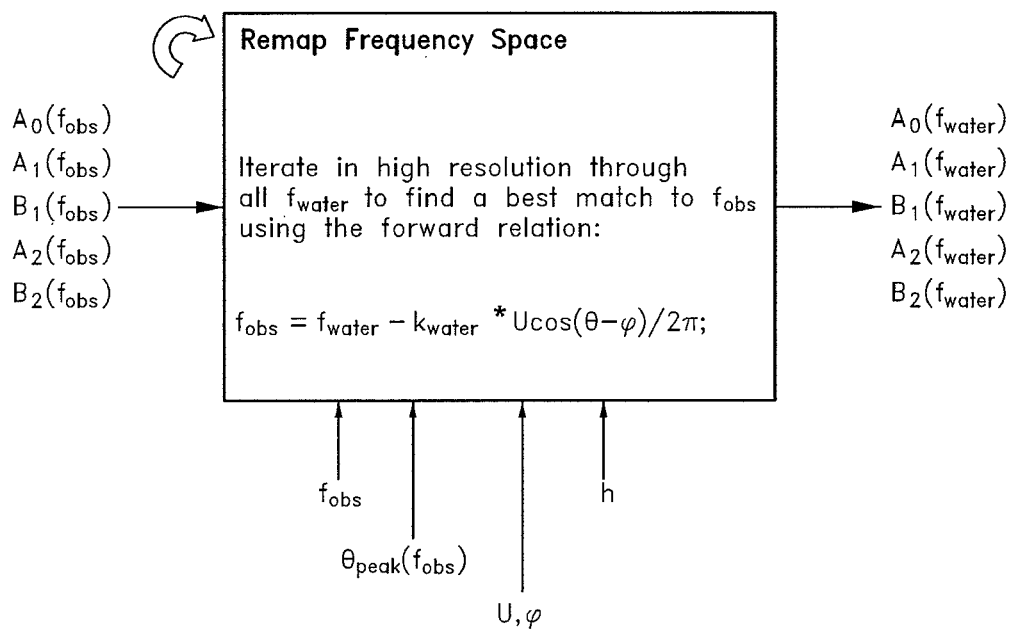
FIG. 11 illustrates a process of remapping frequency space coefficients in the process of FIGS. 9A and 9B.

As illustrated in FIG. 11, remapping of directional spectra in frequency space can be done based on peak direction only since we may be have little knowledge of directional width. Mathematically it can be beneficial to remap a directional spectrum based on "U cos" calculations, where U cos for each frequency f can be calculated using the directional distribution D(θ) at that frequency, and D(θ$_i$, f$_j$) is remapped using U cos(θ$_i$-φ).

If the frequency-direction spectrum D(θ,f) represents the true directional distribution, then the approach above would be ideal. However, triplet based wave measurement, as described with respect to the embodiment above, can be inherently limited in its ability to represent directional width because it is comprised of just the first 3 terms (5 coefficients) of an infinite Fourier series. Knowing that there can be little genuine directional width information in the process, it may be disadvantageous to remap directional spectra based on directional width that may or may not actually exist. One can generally rely on the peak wave direction at each frequency.

Remapping an observed frequency space to correct for the Doppler shift due to forward motion may be a non-linear, frequency dependent process that is complicated by multiple solutions, and boundaries. The risk associated with errors in the data used for remapping can become greater with higher velocities. When moving through the wave field one observes a different wave frequency than if the system were fixed to the water reference frame. The significant motion may be the component of mean velocity in the direction of wave propagation.

Some parameters that influence the Doppler shift of frequency spectrum with motion can include: peak wave direction θ, observed wave frequency f$_{obs}$, wave frequency in the water reference frame f$_{water}$, platform direction φ, platform speed U, and wave number k$_{water}$. U cos(θ-φ) can represent the component of platform velocity in the direction of the waves. It may be beneficial to remap the directional distribution D(θ) at each frequency f using U cos(θ$_{peak}$(f)-φ), based on peak direction only. In such a case, D(θ$_i$,f$_j$) is remapped using U cos(θ$_{peak}$(f)-φ).

As also shown in FIG. 11, a forward relation for determining the observed wave frequency based on the actual wave frequency can be represented by:

$$f_{obs} = f_{water} - k_{water} * U \cos(\theta - \phi) / 2\pi \tag{20}$$

The forward relation can be straightforward, however, we measure observed frequency space and would like to determine the wave frequency in the water reference frame that produced our observation. An iterative numerical approach can find f$_{obs}$.

Observed wave frequency can be defined by the sample rate so it can have insignificant error. Platform speed and direction generally have small errors compared to the scale at which significant changes occur with Doppler shifting. Wave direction, however, can vary significantly with noise introduced by short sampling intervals, and genuine environmental variability. An error in wave direction can introduce an error in U cos that can change how much Doppler shift to apply to remapping. Because remapping of wave frequencies is typically non-linear, errors in U cos can be bounded such that an error in one of its components will not be amplified. For example, the worst case error in U can be 1%. If the platform is traveling aligned with the waves U cos will be in error by 1%. As another example, variance in the estimate of wave direction causes an error of 30 degrees for a particular segment of time. If the platform is traveling perpendicular to the waves at 12 knots, the error in U cos with correct wave direction would be 0. The error in U cos with a 30 degree error in wave direction is now 6 knots. If the waves are aligned with the platform the 30 degree error changes U cos from 12 knots to 10.39.

The error in direction can be catastrophic to the non-linear remapping of frequency and embodiments described herein prevent such error from being propagated. Statistically, wave direction is usually very stable when a significant amount of data is used. One way to address the variability of directional estimates derived from short sample intervals is to combine frequency bands that share the "same" direction. A weighted average peak direction, as described in reference to weighted average peak direction described later in connection with step 1312 (FIG. 13A), may provide a better estimate of direction for the application of U cos. In some embodiments, it can be advantageous to the robust determination of wave direction to have more frequency band averaging at the expense of resolution.

We can easily calculate the observed frequency given that actual frequency. The inverse can be solved via iteration and is sometimes fraught with ambiguity and asymptotes. One way to find $f_{water}$ given an observed frequency $f_{obs}$ is to step through the entire water relative frequency space in high resolution and calculate an $f_{obs}$ and then look for a best match between the input $f_{obs}$ and the calculated $f_{obs}$. This approach is brute force but it allows for easy checking of operational bounds and resolves multiple solutions.

Another approach that can be used to stabilize wave directional estimates used for remapping at step 912 is iteratively averaging in time. Short time intervals can be processed because it allows us to correct for changes in platform motion on shorter time scales, for example, as described above in connection with the overlap-add approach. Directional estimates derived from these shorter segments of time can be too noisy to use for precision remapping of observed frequency space. While we are motivated to use short segments in time to handle platform dynamics, it is generally a good assumption that wave direction is not changing on short time scales (e.g., 2 minutes). It is possible to process, e.g., 20 minutes of data, in which we split up the time into overlapping 2 minute segments to address changes in platform motion, then average the remapped directional estimates over the 20 minutes. A second iteration can them be performed where the individual 2 minute segments are corrected for platform motion relative to the 20 minute averaged estimate of wave direction. To apply averaged wave direction to remapping individual segments, the averaged direction can be un-mapped back to observed frequency space based on platform velocity. This works especially well when the problem we are trying to address with wave direction is variance due to short time series.

Another consideration in remapping coefficients of directional spectra at step 912 can be that Doppler shifting of waves may not effect the directional measurement it simply shifts the directional distribution to a different frequency. This is because, in some embodiments, the primary source for directional information can be the relative amplitudes of the two horizontal components of orbital velocity (U and V), at each frequency. Since each frequency can be treated independently, the ratio of U and V does not change with Doppler shifting, it is simply moved to another frequency.

Figure 12A:
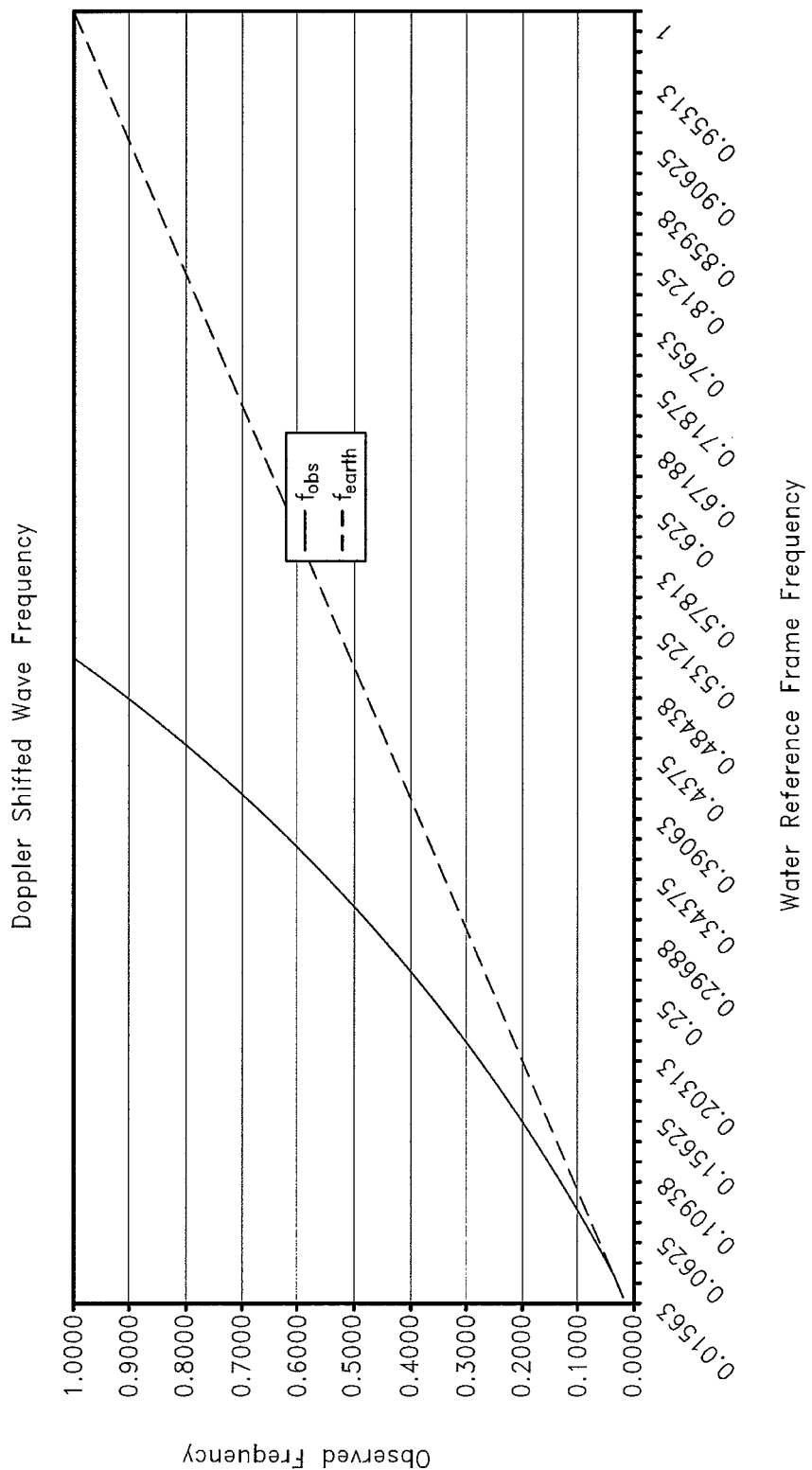
FIGS. 12A and 12B illustrate relationships between observed frequency and water reference frame frequency.

FIG. 12A illustrates Doppler shifted wave frequency when moving against the waves by showing the relationship between a water reference frame frequency and an observed frequency. As illustrated in FIG. 12A, when moving into oncoming waves, the observed frequency will be higher than it is in the water reference frame. For a platform with velocity U, there is some wave frequency at which wave crests are approaching faster than our sample rate can measure. One hits the Nyquist limit prematurely because observed frequency space is Doppler shifted. In chart FIG. 12A, the location where the solid $f_{obs}$ curve intersects the top of the chart is the Nyquist limit. This can be the first stop. It is not that one cannot measure wave energy at Doppler greater than this limit, it is that one cannot unambiguously identify the frequency.

Remapping can take energy spread over higher frequencies and restore it to lower frequencies. Because the spectrum has a noise floor, it can be advantageous to not remap frequency bands that do not rise above the noise floor. This avoids the possibility of remapping the noise floor from high frequencies to bunch it at lower frequencies.

Figure 12B:
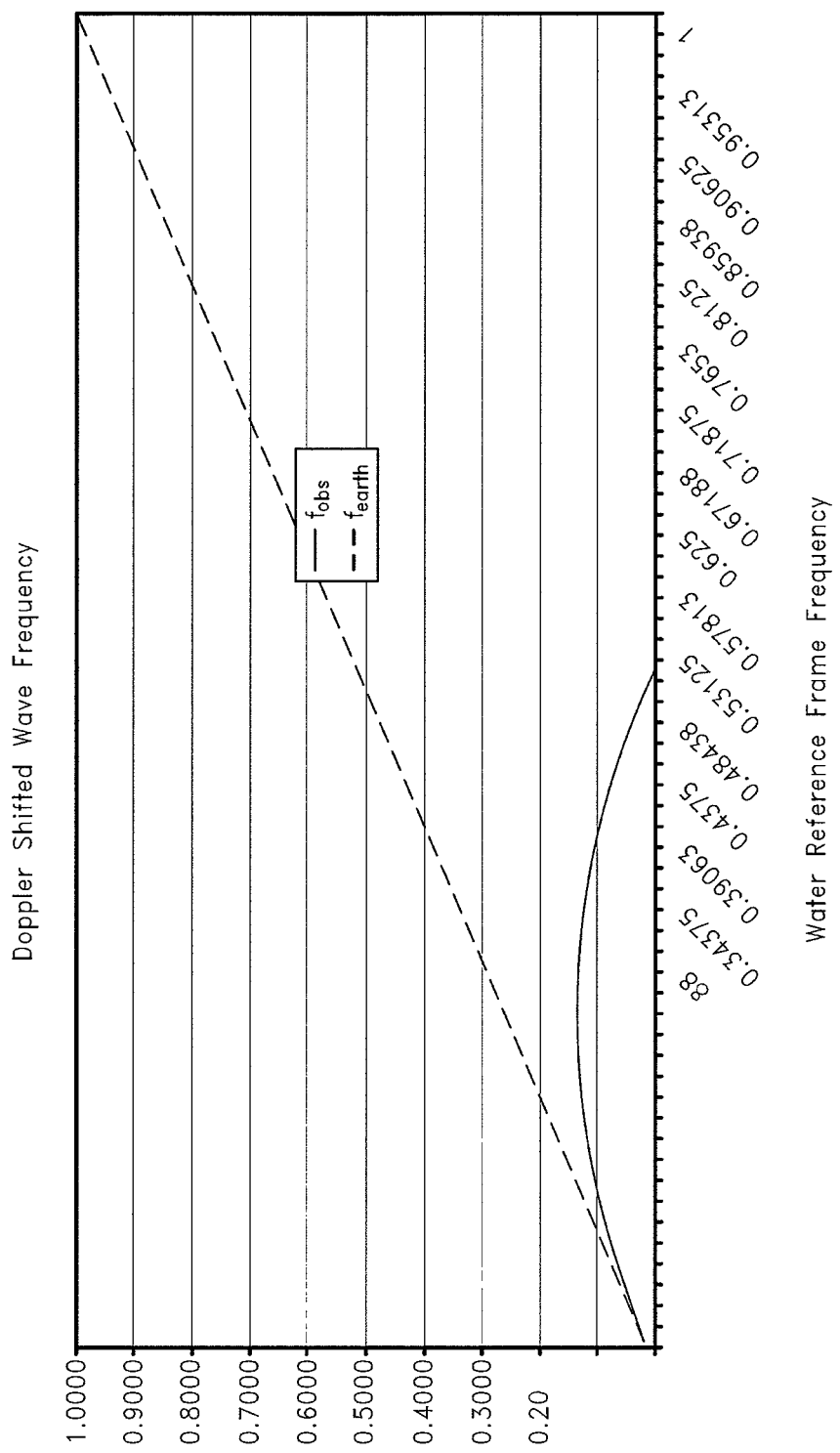

FIG. 12B illustrates Doppler shifted wave frequency when moving with the waves by showing the relationship between a water reference frame frequency and an observed frequency. As shown in FIG. 12B, when moving with the wave direction waves will appear at lower frequency in observed space. Depending on the velocity there may be multiple solutions. This can be the first stop. There is more than one water reference frame wave frequency that can appear as the frequency we observe. The first solution can be the lowest frequency solution and can be more likely to be of operational significance. This corresponds to the rising edge of the solid $f_{obs}$ curve in FIG. 12B. At these frequencies, waves can still be moving faster than the platform, but the difference in velocity approaches 0. The top of the $f_{obs}$ curve can be flat and can correspond to a region where the observed frequency does not change very much over a wider range of water relative frequencies. This can be where the platform velocity matches the group velocity $C_g$.

The second solution can be the downward slope of the solid $f_{obs}$ curve in FIG. 12B. This region can be where the platform can be moving faster than the group velocity $C_g$, but slower than the phase speed. Moving to the right on FIG. 12B, the platform speed approaches the phase speed of waves at these frequencies. This region can present a measurability problem. If one is moving at the same speed and direction as a wave crest (surfing), then the measurement may not be sampling any other part of the wave.

At higher frequencies, the platform velocity can be moving faster than the waves and can be overtaking them. This negative observed frequency space can be measurable but is typically at higher water relative frequencies than is typically remapped. The intersection with 0 can be where the platform velocity almost exactly matches the phase velocity of the wave.

It should be noted that a properly measured observed frequency spectrum should not have any power at frequencies that are above the solid $f_{obs}$ curve in FIG. 12B. Almost all genuine water relative frequencies should fall on or below the peak. This allows an upper cutoff threshold ($f_{upper}$) to be set for observed frequency space. The exception to this can occur in the presence of mean currents if they are not included in the calculation.

The Doppler shift of wave number due to mean currents can also be taken in to account. If the water is not moving relative to the earth then the water reference frame is the earth reference frame. In the presence of a mean current, the two reference frames are not equal. Waves propagate in the water, so if we want to measure waves in the earth reference frame we can employ special handling of this situation. Waves propagating on a mean current do not change frequency; however the earth relative current will change the wavelength. The standard dispersion relation is used to determine wave-number k or wavelength ($2\pi/k$) from radian frequency co.

$$\omega^2 = gk \tan h(kh) \quad (21)$$

Waves propagating on a mean current can follow the Doppler shifted dispersion relationship.

$$(\omega - kU \cos \alpha)^2 = gk \tan h(kh) \quad (22)$$

U can represent the velocity and $\alpha$ can represent the angle between the wave direction and the mean current direction. Intuitively, waves at a given frequency, moving with a mean current will be stretched to greater wavelength. Waves moving against a mean current will typically be compressed to shorter wavelength. While ocean currents are generally small compared to wave speeds at frequencies of interest, this phenomenon can still be accounted for. Mean current may be relevant for two reasons: translation to surface displacement and remapping the frequency space.

Regarding translations to surface displacement, wavelength can dictate the depth to which wave energy is felt. If wave length has been modified by a mean current, then the depth to which the waves are felt can be modified. The actual wave-number/wavelength can be calculated using the Doppler shifted dispersion relationship, in order to accurately translate an orbital velocity measurement at depth to surface wave height.

Regarding remapping the frequency space, in some embodiments, we desire to measure waves in the earth reference frame. When the platform is moving with or against the waves the observed frequency is Doppler shifted. In the presence of a mean current, the wave phase speed and wave number in the earth reference frame are modified. In order to remap observed frequencies to earth reference frequencies we require the earth relative wave-number, which we know has been modified.

One way to address the challenge of mean current is to remove the mean current from the platform velocity used for remapping. This essentially remaps using the platform velocity relative to the water. For example, you are moving with the waves at 3 m/s and a mean current is moving in the same direction at 1m/s. The waves are observed to be bunched at lower frequencies, because of the platform velocity. Simply remapping using 3 m/s as the velocity U introduces error. The error is expressed because the observed spectrum has wave energy at higher frequencies than should be observable at 3 m/s Doppler shift. The higher frequencies occurred because the currents are also moving with the waves. This means that the observed wave frequency was really only Doppler shifted by 2 m/s because the waves are propagating in the water reference frame and the water is moving 1 m/s with the platform.

As a result, because mean currents modify wave-number but do not change frequency, in one embodiment, the velocity used for determining Doppler shifting due to forward motion is not the earth relative velocity of the platform, but the water relative velocity of the platform.

Referring back to FIG. 9A, a segment specific directional upper-cutoff frequency can be implemented at step 916. In some embodiments, any frequency bounds that have been determined during the remapping process can be preserved. More detail is provided in connection with FIGS. 13A and 13B.

Segment coefficients can be accumulated at step 916. Once the coefficients for each segment have been shifted in frequency to correct for Doppler shift, they can be accumulated by adding coefficients for each segment at each frequency of water. The summation of coefficients can be represented by the following equations.

$$A_0(f_{water}) = \sum_{segments} A_0(f_{water}) \quad (23)$$

$$A_1(f_{water}) = \sum_{segments} A_1(f_{water}) \quad (24)$$

$$A_2(f_{water}) = \sum_{segments} A_2(f_{water}) \quad (25)$$

$$B_1(f_{water}) = \sum_{segments} B_1(f_{water}) \quad (26)$$

$$B_2(f_{water}) = \sum_{segments} B_2(f_{water}) \quad (27)$$

The segment specific DWS processing can be repeated until each segment has been processed, as shown in step 918. Then at step 920, the segment specific statistics computed in iterations of step 904 can be averaged over the burst interval. This can include averaging frequency dependent parameters for statistics that indicate variation (e.g., standard deviation) or average values (e.g., mean) for frequency dependent parameters. Averaged coefficients can be converted to DWS at step 922 based on the equation (18) provided for peak detection.

The distribution may be very wide and not particularly useful beyond the use of the peak direction. This may be due to that fact that the remainder of the terms in the Fourier series may not be able and can be difficult to determine based on only three independent measures of wave direction (U,V,W). Because some embodiments can be limited in their ability to determine multi-directional waves and directional width, it may useful to simply extract peak direction. Since the directional width derived from coefficients is broad and graphically not very useful, one can pick a directional width that graphically represents peak direction in a desirable fashion. If it is too wide, it may not make a good pointer to the peak direction. If it is too narrow, users may not be able to see the peak on a contour plot. In one embodiment, the peak direction is derived from the coefficients and represented by a 10 degree wide Gaussian distribution. The Gaussian distribution can be represented by the following equation.

$$D(f,\theta) = e^{-(\theta - peakdir)^2 4 \ln 2 / DIRECTIONALWIDTH^2} \quad (28)$$

At step 924, the frequency resolution can be increased. Because the direction may be more stable with short time frame segments, decreasing frequency resolution (increasing averaging), the directional spectrum may not be long in the same resolution as the non-directional spectrum. Later the directional spectrum can be resealed by the non-directional power so, while true resolution may not be restored, the directional spectrum can be mapped to a structure with twice the number of frequency bands, for later use.

At step 926, the DWS can be normalized. Since non-directional power at each frequency band is determined separately by another algorithm, each directional distribution can be normalized to an area of 1 in preparation for rescaling later, as indicated by the equation below.

$$\sum_\theta D(f, \theta) = 1 \tag{29}$$

Figure 13A:
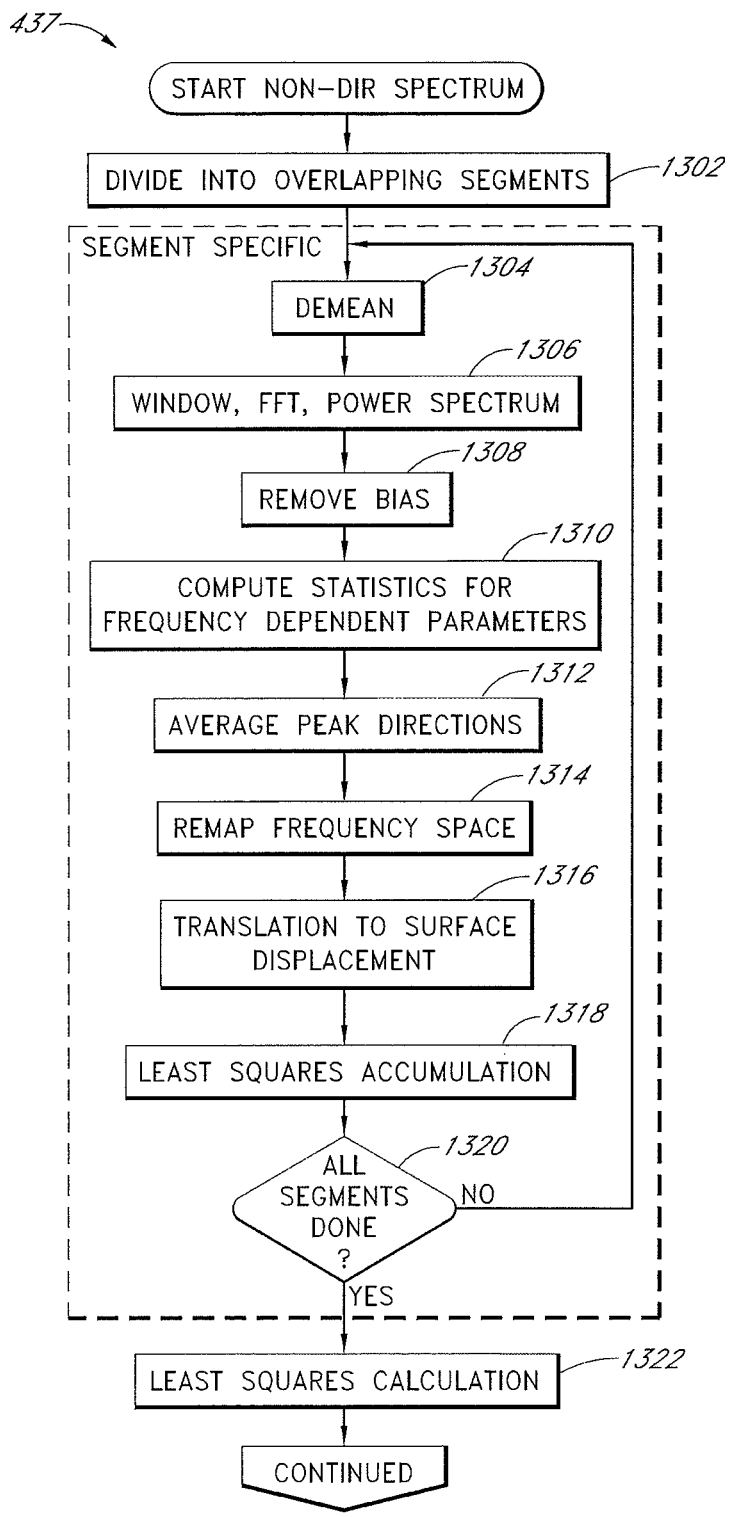
FIGS. 13A and 13B illustrate an embodiment of a process of calculating a non-directional wave spectrum in the process of FIG. 7.
Figure 13B:
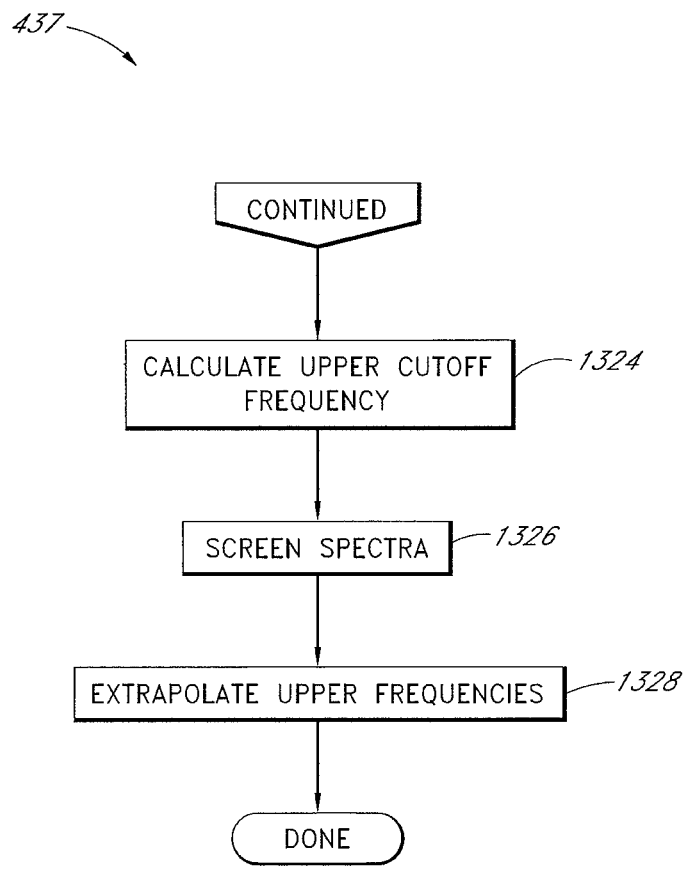

FIGS. 13A and 13B illustrate a process 437 of calculating a non-directional wave spectrum. The process 437 provides more detail regarding step 437 of FIG. 7. In one embodiment, the strategy for handling motion is the substantially the same for the non-directional algorithm as for the directional algorithm. However, in other embodiments, the approach can be optimized differently for non-directional waves. In one embodiment, burst interval of, for example, 20 minutes can be split up into shorter segments and dynamics can be addressed by applying frequency dependent parameters to each segment independently before accumulating them. The directional algorithm, for example, the process 435 (FIGS. 9A, 9B) can be somewhat resilient to minor errors because the only piece of information that we are estimating is direction. By contrast, the non-directional algorithm of the process 437 can address subtle inaccuracies because small errors in such a non-linear process can lead to a huge error in the estimate of sea surface wave height.

At step 1302, the process 437 can divide time series data into overlapping segments. This can include any of the features described above in reference to step 902 (FIG. 9A) of the directional process 435 and described in connection with FIG. 10.

In one embodiment, the directional algorithm 435 can accumulate segments utilizing a single large volume of water that was coordinate transformed to earth coordinates. By contrast, the non-directional algorithm 437 can accumulate over segments and sensors (e.g., bins, beams, etc.). So the time series of velocity may be returned to beam coordinates for the non-directional algorithm 437.

As part of the overlap-add process of step 1302, coordinates can be transformed into beam coordinates. The Weighted Least Squares approach of step 1308 detailed below can be a robust way to combine data from different sensors at different depths. One can capitalize on this working algorithm by combining sensors and segments. A wide range of depths and segment environments may improve its estimation.

A sample interval can be divided into segments. The frequency resolution can be improved to support remapping of frequency space. In order to do this, time resolution may be sacrificed. Rather than using, for example, a 2 minute segment, one can use, for example, a 4 minute segment. This can improves the frequency resolution of spectra by a factor of 2, but may mean that it cannot respond as accurately to substantial dynamics that occur over a 4 minute timeframe.

Each overlapping segment created in step 1302 can be processed separately by segment specific steps 1304 to 1320. A segment can be demeaned at step 1304. One consequence of a trend in the velocity data during a burst interval is that power can bleed into lower frequencies. Once the platform motion has been removed one would expect the velocity time series to be close to 0 mean. There are at least two primary reasons why there could be a remaining offset. First, mean currents can offset the mean. Second, offset error in the estimation of platform velocity can also offset the mean.

Currents are generally small, but can still be significant. Using inertial as a source for earth reference platform velocity may involve some potential inaccuracy. Some inertial systems have good scale factor error, but can drift, or offset, with time if they do not have an independent fix. In one embodiment, a wave processing system can use inertial as the estimate for platform velocity even if it has drifted, because the data is demeaned and because the scale factor error is small. Waves can have correct magnitudes, but can be superimposed on a slowly changing unknown offset error.

Demeaning in this case can involve a high pass filter. The offset can be removed by calculating a sliding average, centered on the data to be fixed, and subtracting the average. In one embodiment, the high pass filter width can be 120 samples. This may narrow enough to respond to changes in platform motion during, for example, a 20 minute burst interval, but wide enough to leave wave frequencies (<30 s period) intact. This relationship can be represented by the following equation.

$$NewVel(t) = OldVel(t) - \sum_{t-60}^{t+60} OldVel(n)/120 \tag{30}$$

Figure 14:
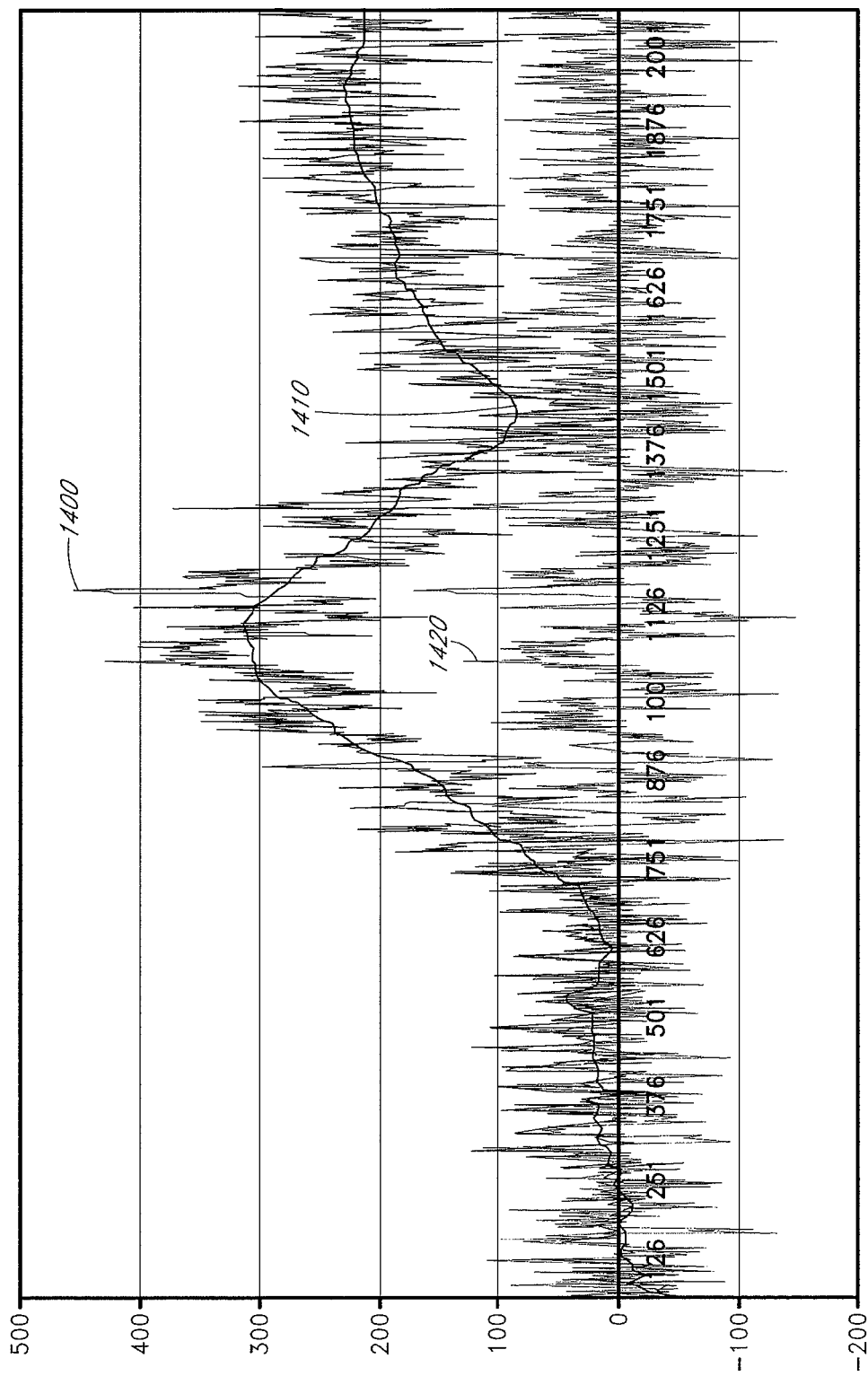
FIG. 14 illustrates demeaned time series data in the process of FIGS. 13A and 13B.

FIG. 14 graphically illustrates demeaning velocity data of a segment. Curve 1400 represents velocity data, curve 1410 represents local mean data, and curve 1430 represents demeaned data. The demeaned data curve 1430 can preserve the features of velocity curve 1400, while removing an offset. As shown in FIG. 14, the offset can vary.

Referring back to FIG. 13A, each segment can be windowed, transformed into the frequency domain with a FFT, and a segment specific power spectrum can be computed at step 1306. In one embodiment, a standard Bartlett window is applied. Because the window is applied in the time domain, power spectra can be normalized later to account for the power introduced by the square of a Bartlett window. In other embodiments, any window known to those skilled in the art can be used. In one embodiment, a standard FFT algorithm is used. Other algorithms may also be used to transform time domain data into the frequency domain. The power spectrum can be represented by the frequency spectrum multiplied by its complex conjugate, as show in the equation below.

$$\hat{p}^2 = \hat{F} * \hat{F}' \tag{31}$$

The un-translated, un-remapped (observed) power spectra for each segment can be preserved for later use. These raw measurements can be representative of signal to noise ratio and can be useful for determining upper cutoff frequency later.

The choice of a window can reduce propagation of errors due to spectral bleeding and resolution. The Doppler shift due to forward motion in the same direction as the waves tends to move the observed spectrum to lower frequency and give it a narrower, more bunched, shape. If the observed spectrum has bled into higher frequencies due to processing or resolution limitations, then the remapping function can amplify this error. Because the Doppler shift is strongly non-linear with frequency, a slight misplacement of spectral power in the observed space can turn into a catastrophic misplacement in remapped earth-frequency space. This error can further be amplified by the frequency dependent, non-linear translation to surface displacement.

TABLE 3

| 6 m/s Forward Motion | | | |
| --- | --- | --- | --- |
| | obs | remappe | velocity at 100 m |
| f | 0.0565 | 0.08 | 16 |
| f + Δf | 0.064332 | 0.11 | 1. |

For example, a platform is moving with the waves at 6 m/s at a depth of 100 m. Wave energy is bunched at lower frequency by the Doppler shift. The actual wave frequency is 0.083 Hz but is has been Doppler shifted to 0.056 Hz in observed space. The spectral bleeding and course resolution has caused some portion of the power in the 0.056 Hz band to show up in the next adjacent band (0.064 Hz). The power that has erroneously bled into this band will be remapped to 0.12 Hz in the earth frequency space. The gain to translate to surface displacement, at this frequency is 100 times greater than the gain for the true frequency.

As a result, an otherwise typical spectrum distributed over many frequency bands, can be compressed by Doppler shift to the degree that resolution and spectral bleeding become a problem. To mitigate this risk one may have adequate spectral resolution and windowing when processing non-directional spectra.

Analysis of error sources associated with remapping related to spectral bleeding described above shows that it is, in some embodiments, desirable for the non-directional algorithm to favor resolution. Yet analysis of propagation errors due to noise in directional estimates described above in connection with FIG. 11 shows that that it is desirable, in some embodiments, for the directional algorithm to perform more frequency band averaging at the expense of resolution to improve the stability of directional estimates. These conflicting design criteria can be significant because the two algorithms can be dependent on each other and require exchange of spectral information.

One solution is to allow different frequency banding for the directional algorithm than the non-directional algorithm and interpolate any data that is passed between the two processes to the same resolution. For example, by processing directional spectra with 128 frequency bands from 0-1 Hz, and processing non-directional spectra with 256 bands from 0-1 Hz, we can get the best of both worlds. The non-directional spectrum has adequate resolution to isolate narrow peaks and avoid spectral bleeding, while the directional spectrum benefits from the directional stability associated with more averaging. The key dependency between the two algorithms can be the need for wave direction information in order to remap non-directional spectra. The map of peak directions with each frequency can be interpolated to the higher resolution of the non-directional spectrum before it is used.

Segment specific bias can be removed at step 1308. Bias removal can be performed because the significant wave height may be determined using the area under the power spectrum. Instrument noise floor can be modeled as white noise which offsets the whole spectrum. While the area introduced by the noise floor is usually small, it is clearly not waves. Removal involves measurement of the spectral noise floor and subtracting this offset from the whole spectrum, before translation to surface displacement. To determine the spectral noise floor, one can use a region of the spectrum that typically does not have much real wave energy say from 0.8-1.0Hz. Typically, this region is representative of measurement noise, not environment. The noise floor of the ADCP can change with range, system frequency, and bin size, so the value may be empirically determined.

Segment specific statistics can be computed at step 1310. This step can implement any of the features described above in reference to step 904 (FIG. 9A).

Segment specific average peak direction can be determined at step 1312. Once the observed power spectrum for a segment has been determined, this can be used to further stabilize the directional estimates. When wave direction at each individual frequency band, for each segment is used to remap frequency space, the quality of the remapped spectrum may be suspect. This may be because the directional estimation can be noisy, due to the fact that a single 2-4 minute segment does not contain very many samples. One approach is to perform more band averaging based on the idea that waves with similar direction really are coming from a single direction (a storm or wind event). In practice, using a single direction derived from the peak of power gives a more robust and realistic result when remapping frequency space. Knowing this, the first determination is an algorithm that groups adjacent frequency bands that share a common direction can be used. Second, because the reliability of wave directional estimates is higher when the signal to noise ratio is high an algorithm that weights wave direction estimates more when they have significant power can be used.

This assumes that waves are generated by wind events and storms on the ocean. Most often, waves arriving from a particular storm have a common direction. Another different storm at another direction will create its own spectrum that will appear to be coming from the new direction.

Because some embodiments use short time intervals (e.g., 2 minutes), directional data can have a large variance. This variance can propagate into substantial errors. By grouping frequency bands that have common wave direction (and presumably a common source) the peak directions of these adjacent bands can be averaged to reduce the variance of the directional estimate.

In some embodiments, waves coming within 60 degrees of the wave direction at the frequency of peak power are considered to be in a common wave direction. Other values for the range may be used, such as 30 degrees or 45 degrees. One embodiment of the process is as follows:
1. Using the observed non-directional power spectrum, find the observed frequency ($f_{peak}$) at with the most power.
2. At this peak frequency, find the peak direction $\theta_{peak}$ in the observed (not remapped) directional spectrum.
3. Search both forward and backward from the peak of power to group adjacent frequency bands that have peak direction within 60 degrees.
4. Stop when a frequency band is reached that has wave direction outside of this threshold.
5. Search for a new peak of non-directional power using only the remaining ungrouped frequency bands.
6. Repeat the grouping process.
7. Repeat a third time.
8. Steps 1 to 7 can group frequency bands by common direction into 3 possible directions. Next a power weighted average can be applied to each group. This can provide the benefit of band averaging to quieting the directional estimate and presumes that frequency bands with a good signal to noise ratio are more accurate and should be weighted more.
9. The averaging of direction is a vector average and can be accumulated in sine and cosine components 10. Accumulate weighted sine components over the frequencies in each group, according to the following equations:

$$\text{Sines} = \Sigma_f(P(f) * \sin(\theta(f))) \quad (32)$$

$$\text{Cosines} = \Sigma_f(P(f) * \cos(\theta(f))) \quad (33)$$

$$D_{avg} = \arctan(\text{Sines}/\text{Cosines}) \quad (34)$$

11. Normalization may not be required because only the ratio of the sine to cosine may be important, not the individual magnitudes. Finally these smoothed estimates of peak direction can be used for remapping.

Figure 15:
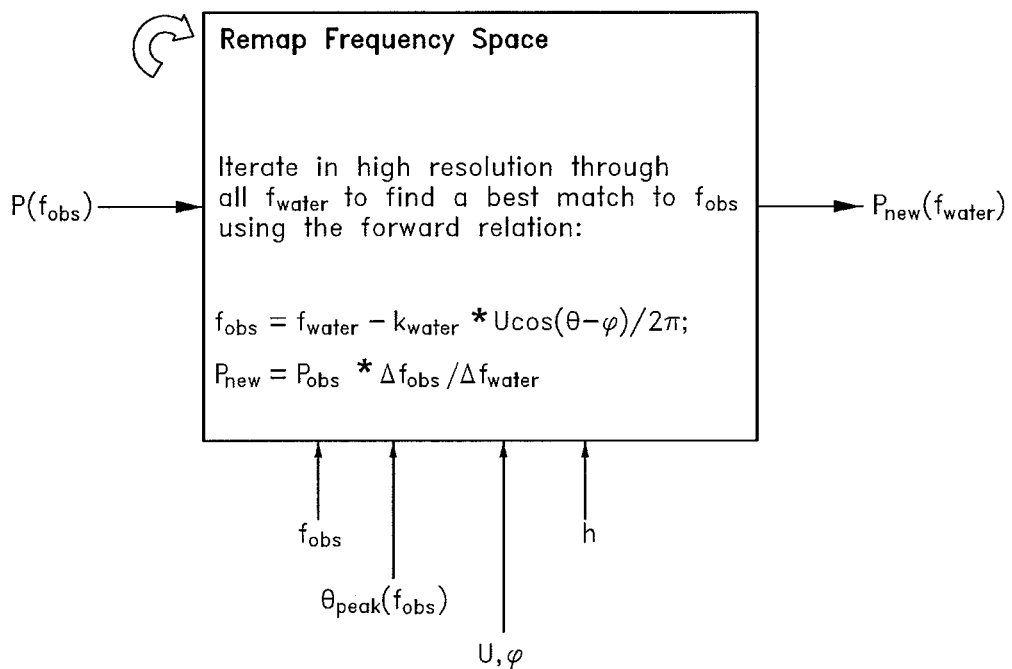
FIG. 15 illustrates a process of remapping a frequency space and power in the process of FIGS. 13A and 13B.

At step 1314, segment specific remapping of the frequency space can be performed. One embodiment of remapping the observed power spectrum to water relative frequency space is similar to the procedure used for the directional algorithm. Yet, remapping can include differences for the non-directional spectra. For example, directional estimates can be further refined, for example, by averaging peak detections at step 1312. In addition, because frequency space can be stretched or compressed in a non-linear fashion, one can both move power to a new frequency, and scale the power at each frequency band to preserve the power at the new band width or $\Delta f$. Another difference is that frequency resolution can be higher, so that errors in remapping may not occur when attempting to restore a spectrum that has been compressed into just a few bands by the Doppler shift. Additionally, the operational stops asserted by the remapping algorithm may contribute to the determination of highest usable frequency. FIG. 15 illustrates remapping the frequency space for non-directional spectra.

Segments can be translated to surface displacement at step 1316. The translation from orbital velocity at a depth to surface displacement can be derived from linear wave theory and the geometry of the system. A translation equation T (f) can be found for each segment and each sensor based on the depth, altitude and sensor geometry, during that segment. It is presumed that the orbital velocity spectrum to be translated has already been corrected for Doppler shift due to forward motion. The equation for surface displacement is:

$$\eta(\omega) = \sqrt{\sum_{i=beams} \frac{V_i^2 \sinh^2(kh)}{\omega^2 \left[ \begin{array}{c} 2\cosh^2(k(h+z))\sin^2(J) - \\ 4\sinh^2(k(h+z))\cos^2(J) \end{array} \right]}} \quad (35)$$

In this equation, $\omega$ can represent a frequency in radians, k can represent a wave number, V can represent a beam radial velocity, h can represent a water depth, z can represent a submergence at the sensor, and J can represent a Janus beam angle.

A "weighted-least squares" calculation of surface spectrum SH, SV, and remapped SV can be performed for a segment at step 1312. The following sums can be accumulated over sensor and segment at each frequency:

$$SV(f) = \sum_n^{Segments} \sum_m^{Sensors} SV_{n,m}(f) \quad (36)$$

$$T(f) = \sum_n^{Segments} \sum_m^{Sensors} T_{n,m}(f) \quad (37)$$

$$T^2(f) = \sum_n^{Segments} \sum_m^{Sensors} T_{n,m}^2(f) \quad (38)$$

$$TSv(f) = \sum_n^{Segments} \sum_m^{Sensors} T_{n,m}(f) Sv_{n,m}(f) \quad (39)$$

$$TSr(f) = \sum_n^{Segments} \sum_m^{Sensors} T_{n,m}(f) Sr_{n,m}(f) \quad (40)$$

In these summations, SV can represent the orbital velocity spectrum at depth, SR can represent orbital velocity remapped to correct for Doppler shift, SH can represent the earth reference surface spectrum, T can represent the translation equation, m can represent the number of sensors or beams times range cells, n can represent the number of segments, and N can represent n times m.

In addition to the summations provided above, accumulations can be performed that duplicate these with T set equal to one rather than T containing the frequency/depth dependent translation equation. This allows us to determine fitted, averaged, orbital velocity spectra later, for use with the screening and upper cutoff frequency algorithms.

In one embodiment, step 1312 estimates a best fit for the surface spectrum SH that reproduces the velocity spectrum SV at depth when the translation equation T is applied. Some embodiments of the approach differ from a least squares fit. There are at least three innovations to this approach that are not exactly a Least Squares fit. Rather than accumulating data over all sensors, the implementation can be generalized to accumulate over both sensors and segments. The idea is that the accumulation can address both kinds of averaging. Rather than accumulating data over all sensors, the implementation can be generalized to accumulate over both sensors and segments, as indicated by equations (36)-(40) provided above. The idea is that the accumulation can address both kinds of averaging. Terms can be added so that we determine a best fit for not just surface height, but remapped orbital velocity spectrum and un-remapped orbital velocity spectrum, as indicated in the equations below. Equation (41) adds terms so that we determine a best fit for not just surface height, but remapped orbital velocity spectrum and un-remapped orbital velocity spectrum.

$$SR(f) = \sum_n^{Segments} \sum_m^{Sensors} Sr_{n,m}(f) \quad (41)$$

$$TSr(f) = \sum_n^{Segments} \sum_m^{Sensors} T_{n,m}(f) Sr_{n,m}(f) \quad (42)$$

Using equation (41), which represents orbital velocity remapped to correct for Doppler shift, the earth reference surface spectrum can be represented by the following equation.

$$SH(f) = \frac{[SR(f)]}{[T(f)]} \quad (43)$$

This can be the final equation for surface displacement. However, in some embodiments, an un-translated remapped spectra and un-translated un-remapped spectra can be calculated as well. The same equation can be used with in which T=1 for all sensors and segments. This can provide an un-translated spectrum and use SV accumulations rather than SR for un-remapped spectra, as represented by the following equations.

$$S_{NoTrans}(f) = \frac{[SR(f)]}{[T(f)]} \text{ with } T = 1 \quad (44)$$

$$S_{NoTransNoRemap}(f) = \frac{[SV(f)]}{[T(f)]} \text{ with } T = 1 \quad (45)$$

In another embodiment using a least squares approach, the equations can be represented by:

$$T(f)T(f) = T(f) \times T(f) \quad (46)$$

$$T(f)SV(f) = T(f) \times SV(f) \quad (47)$$

$$T(f)SR(f) = T(f) \times SR(f) \quad (48)$$

$$SH(f) = \frac{[TSR(f) - T(f)*SR(f)]}{[N*T^2(f) - T(f)*T(f)]} \quad (49)$$

However, when there is very little variation with depth, the process falls apart because the denominator goes to 0. Instead, the values that are higher in the water column can be weighted as more significant by removing the factor N from the denominator. This simplifies to the following equation.

$$SH(f) = \frac{[TSR(f) - T(f)*SR(f)]}{[T^2(f) - T(f)*T(f)]} \quad (50)$$

In one embodiment, this can be the final equation for surface displacement. However, un-translated remapped spectra and un-translated un-remapped spectra can also be calculated. The same equation can be used with T=1 for all sensors and segments, to get un-translated spectra and use Sv accumulations rather than Sr for un-remapped spectra, as represented by the following equations.

$$S_{NoTrans}(f) = \frac{[TSR(f) - T(f)*SR(f)]}{[T^2(f) - T(f)*T(f)]} \text{ with } T = 1 \quad (51)$$

$$S_{NoTransNoRemap}(f) = \frac{[TSV(f) - T(f)*SV(f)]}{[T^2(f) - T(f)*T(f)]} \text{ with } T = 1$$

Referring back to FIG. 13A, step 1320 can determine if all segments are processed. Steps 1304 to 1320 can be repeated until all segments are processed. Then a least squares calculation can be computed over all segments at step 1322. This can output fitted, observed velocity spectrum Sc, remapped velocity spectrum Sr, and surface spectrum Sh.

At step 1324, an upper cutoff frequency can be calculated. Step 1324 can implemented any of the features described in connection with step 914 (FIG. 9A). One embodiment of step 1324 determines a highest usable frequency based on signal to noise ratio in actual data, and the extent to which the signal/noise may be amplified. One embodiment of the process is outlined below:

1. Calculate the collective spectral noise floor σ of the measure data.

$$\sigma = \text{StandardDeviation}[S_{NoTransNo\,Re\,map}]_{0.8\,Hz}^{1.0\,Hz} \quad (52)$$

2. Use the highest frequency portion of the spectrum as representative of noise floor since we expect little or no measurable wave energy at these frequencies
3. Calculate the signal using the magnitude of the remapped orbital velocity power spectrum.

$$S_{NoTrans}(f) \quad (53)$$

4. Calculate the average translation to surface displacement T(f). Either the mean or the maximum can be used. The maximum is more conservative if there are dynamics in depth.

$$\left[ T(f) = \sum_{n}^{Segments} \sum_{m}^{Sensors} T_{n,m}(f) \right] \quad (54)$$

5. Calculate GN2S as a function of frequency.

$$GN2S(f) = \frac{T(f)*4\sigma}{S_{NoTrans}(f)} \quad (55)$$

6. Find the Peak frequency of the remapped spectrum $$f_{peak} = f \text{ where } S_{NoTrans}(f) \text{ is maximum} \quad (56)$$

7. Search forward of the peak till GN2S(f)>100. The frequency where this occurs becomes our upper cutoff.

Spectra can be screened at step 1326. Screening spectra for signal to noise ratio may allows us to reject individual frequencies based on requiring adequate wave signal above the instrument noise floor. One embodiment of a process for screening spectra is outlined below:

1. Calculate the collective spectral noise floor a of the measure data.

$$\sigma = \text{StandardDeviation}[S_{NoTransNo\,Re\,map}]_{0.8\,Hz}^{1.0\,Hz} \quad (57)$$

2. Use the highest frequency portion of the spectrum as representative of noise floor since we expect little or no measurable wave energy at these frequencies
3. Calculate the signal using the magnitude of the remapped orbital velocity power spectrum.

$$S_{NoTrans}(f) \quad (58)$$

Signal to noise ratio is:

$$\text{SignaltoNoise} = S_{NoTrans}(f)/4\sigma \quad (59)$$

This can require that the signal is greater than 4σ.
4. Screen Translated Spectra based on this criteria.

if (Signal To Noise<1)$Sh(f)$=0 \quad (60)

Then at step 1328, upper frequencies can be extrapolated. The upper portion of the spectrum that can be difficult to determine because the signal can be too small, can be extrapolated using the assumption that wave energy drops exponentially from the last good value. It is sometimes more robust to utilize more than one last data point as the seed for this extrapolation.

$$S_{UpperCutOff+}(f) = f_{lastgood} e^{decay\,(f-flastgood)} \quad (61)$$

Once both non-directional power spectrum and normalized directional spectra have been calculated independently, the normalized directional distributions can be scaled by the non-directional power.

$$D(f,\theta) = D_{norm}(f,\theta) \times P(f) \quad (62)$$

such that $$\theta \int D(f,\theta) = P(f) \quad (63)$$

Then wave parameters can be calculated from the directional spectra and non-directional spectra using standard methods. For example, as described above in reference to FIG. 7.

Figure 16:
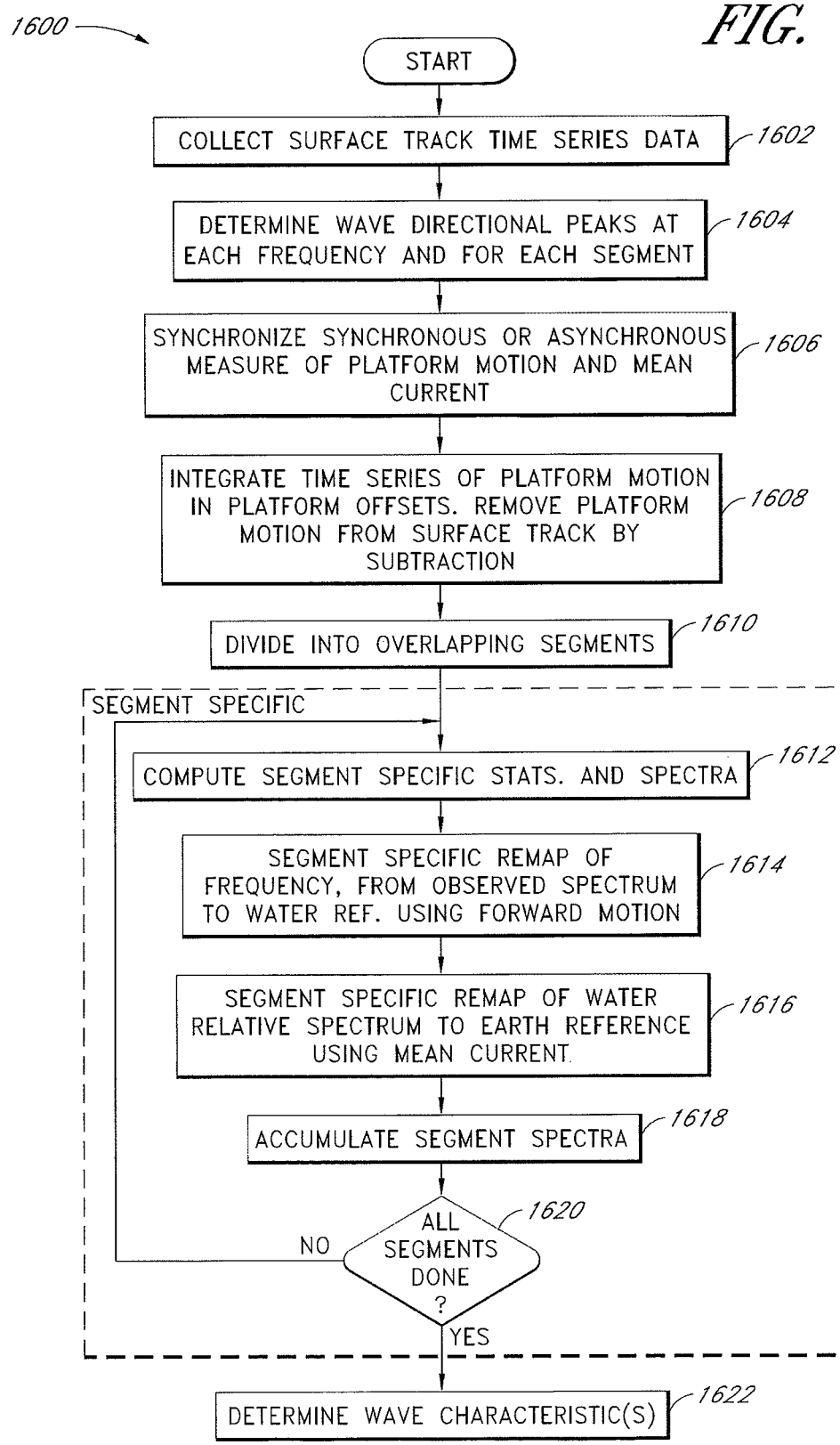
FIG. 16 illustrates an embodiment of a process for determining one or more wave characteristics utilizing surface track data.

Referring to FIG. 16, a process 1600 for determining one or more wave characteristics utilizing surface track is provided. The process 1600 can be implemented as an alternative or in addition to at least a portion of any of the orbital velocity approaches described above. A surface track approach can be similar to any of the orbital velocity approaches described above. The surface track approach can determine non-directional spectrum by splitting up the sampling period into shorter overlapping segments in time, then correcting each segment for the specific platform motion that occurred during that time.

The process 1600 can collect surface track data at step 1602. Surface track data can be obtained from an upward facing ADCP. The upward facing ADCP 402 can include any combination of the features of the ADCP 202 (FIG. 2) and/or the ADCP 300 (FIG. 3). The surface track data can include a time series of echo located ranges to the surface. Typically the time series data is sampled at a frequency of 2 Hz or more.

The surface track data can be used to determine wave directional peaks at step 1604, for example, using any combination of the techniques described in connection with the process 435 (FIGS. 9A and 9B). Peak wave directions can be determined at each frequency for each segment of the surface track data.

The time series of echo located ranges to the surface are typically sampled and combined with synchronous measurements of the platform motion at step 1606. For example, synchronous or asynchronous measures of platform motion and mean current can be synchronized with the surface track data using any of techniques described in reference to the data acquisition system 410 (FIG. 4A) and/or the data acquisition process 410' (FIG. 5). The output at step 1606 can include East, North, and Z velocities of a platform at the sample rate.

At step 1608, time series data of platform motion can be integrated into platform offsets. The time series data can include X, Y, Z potion offsets for the platform at the sample rate. In addition, platform motion can be removed from surface track data by subtraction at step 1608. The resulting time series can contain only surface elevation (earth relative vertical range) unbiased by platform response.

The time series data can be divided into overlapping segments at step 1610. For example, this can be done as described in reference to step 1302 (FIG. 13A).

Segment specific processing can be performed in steps 1612-1620. This can include converting time series data to power spectra via a FFT and calculating segment specific statistics at step 1612. Segment specific statistics can include statistics indicative of an average value and/or variation in data. The process 1600 can then utilize peak wave direction (determined in advance by the directional wave algorithm), and mean platform velocity during the segment sampling period, to correct for Doppler shift. The resulting water relative spectrum can then be corrected to the earth reference frame using wave directional peaks and the mean current. This can be accomplished by remapping the frequency space from observed spectrum to water reference using forward motion for each segment at step 1614. The water relative surface spectrum provided by step 1614 can then be remapped relative to the earth reference using mean current at step 1616. The segment specific earth relative surface spectrum can be accumulated at step 1618. This can include averaging individually corrected segments together. By the time that each segment has been processed, a representative non-directional spectrum for the whole sampling period can be created.

After segment specific processing is determined to be done at step 1620, additional post processing can be performed. Then one or more wave characteristics can be determined from the directional and/or non-directional wave spectra at step 1622. Thus, surface track data can be used as an alternative or in addition to an orbital velocity approach to determine one or more wave characteristics from a moving platform.

Specific embodiments of systems and methods of determining wave characteristic using a moving platform are described herein. While the specification describes particular examples of the present invention, those of ordinary skill can devise variations of the present invention without departing from the inventive concept.

CONCLUSION

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be connected to the processor such that the processor can read information from, and write information to, the storage medium. In the alternative, the storage medium may be integral to the processor. The processor and the storage medium may reside in an ASIC.

Depending on the embodiment, certain acts, events, or functions of any of the methods described herein can be performed in a different sequence, can be added, merged, or left out all together (e.g., not all described acts or events are necessary for the practice of the method). Moreover, in certain embodiments, acts or events can be performed concurrently, rather than sequentially.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

What is claimed is:

1. A system for determining at least one wave characteristic, the system comprising:
    a sonar system configured to obtain data indicative of motion of water relative to a platform;
    an earth reference sensor configured to obtain data indicative of motion of the platform relative to a fixed reference frame; and
    a processor configured to determine at least one wave characteristic by combining the data indicative of motion of the water relative to the platform and the data indicative of motion of the platform to the fixed reference frame, so as to mathematically compensate for the motion of the platform relative to the fixed reference frame.

2. The system of claim 1, wherein the sonar system comprises an acoustic Doppler current profiler.

3. The system of claim 1, further comprising a display configured to output the at least one wave characteristic.

4. The system of claim 1, wherein the at least one wave characteristic comprises height, period, or direction of a wave.

5. The system of claim 1, wherein the data indicative of motion of water relative to the platform comprises one of following: inertial data, bottom track data, or surface track data.

6. The system of claim 1, wherein the data indicative of motion of the platform relative to a fixed reference frame comprises velocity and orientation data.

7. The system of claim 1, wherein the processor is further configured to perform one or more coordinate transformations in the time domain to bring at least a portion of the data indicative of motion of water relative to the platform and the data indicative of motion of the platform relative to the fixed reference frame into the same coordinate system.

8. A method of determining at least one wave characteristic, the method comprising:
    receiving data indicative of motion of water relative to a platform from an acoustic Doppler current profiler (ADCP);
    receiving data indicative of motion of the platform relative to a fixed reference frame from a reference sensor; and
    determining, using a processor in communication with the ADCP and the reference sensor, at least one wave characteristic by combining the received data to mathematically compensate for the motion of the platform relative to the fixed reference frame.

9. The method of claim 8, further comprising synchronizing the data indicative of motion of water relative to the platform and the data indicative of motion of the platform relative to a fixed reference frame.

10. The method of claim 8, further comprising isolating, in the time domain, platform, water, and earth reference frames from the data indicative of motion of water relative to a platform and the data indicative of motion of the platform relative to a fixed reference frame.

11. The method of claim 8, further comprising performing one or more coordinate transformations in the time domain to bring at least a portion of the data indicative of motion of water relative to a platform and the data indicative of motion of the platform relative to a fixed reference frame into the same coordinate system.

12. The method of claim 8, wherein determining the at least one wave characteristic comprises overlap-add spectral processing.

13. The method of claim 12, wherein:
overlap-add spectral processing comprises computing segment specific statistics, and
determining the at least one wave characteristic comprises averaging segment specific statistics for two or more segments.

14. The method of claim 12, wherein determining the at least one wave characteristic comprises remapping the frequency space for a segment to determine coefficients of a wave spectrum for a wave frequency in a water reference frame.

15. The method of claim 8, wherein determining the at least one wave characteristic comprises triplet processing.

16. The method of claim 8, wherein determining the at least one wave characteristic comprises determining a directional wave spectrum.

17. The method of claim 8, wherein determining the at least one wave characteristic comprises determining a non-directional wave spectrum.

18. The method of claim 8, wherein determining the at least one wave characteristic comprises correcting for platform motion on a short time scale.

19. A method of determining at least one wave characteristic on an electronic device, the method comprising:
receiving acoustic derived data indicative of motion of water relative to a platform and data indicative of motion of the platform relative to a fixed reference frame;
transforming at least a portion of the received data into data indicative of motion of water relative to the fixed reference frame;
determining a directional wave spectrum based at least in part on the transformed data;
determining a non-directional wave spectrum based at least in part on the directional wave spectrum; and
deriving at least one wave characteristic based at least in part on at least one of the directional wave spectrum and the non-directional wave spectrum.

20. The method of claim 19, further comprising synchronizing the data indicative of motion of water relative to the platform and the data indicative of motion of the platform relative to a fixed reference frame.

21. The method of claim 19, wherein determining the directional wave spectrum includes dividing at least a portion of the received data into overlapping segments.

22. The method of claim 21, wherein determining the directional wave spectrum includes calculating a segment specific cutoff frequency.

23. The method of claim 19, wherein determining the non-directional wave spectrum includes a weighted accumulation based on data summed over sensors and segments.

24. The method of claim 19, wherein determining the non-directional spectrum comprises segment specific remapping a power for an observed frequency to a power for a wave frequency in a water reference frame.

25. The method of claim 19, further comprising resealing the directional wave spectrum based at least in part on the non-directional wave spectrum, wherein deriving the at least one wave characteristic is based at least in part on a resealed directional wave spectrum.

26. The method of claim 19, wherein determining the directional wave spectrum includes deriving the directional wave spectrum from a relatively short time series of the transformed data, and decreasing the frequency resolution of the transformed data.

27. A non-transitory computer-readable storage medium comprising instructions that when executed perform a method, the method comprising:
receiving data indicative of motion of water relative to a platform from an acoustic Doppler current profiler (ADCP);
receiving data indicative of motion of the platform relative to a fixed reference frame from a reference sensor; and
determining, using a processor in communication with the ADCP and the reference sensor, at least one wave characteristic by combining the received data to compensate for the motion of the platform relative to the fixed reference frame via synchronizing and collocating the data indicative of motion of water relative to the platform and the data indicative of motion of the platform relative to the fixed reference frame.

28. A non-transitory computer-readable storage medium comprising instructions that when executed perform a method, the method comprising:
receiving acoustic derived data indicative of motion of water relative to a platform and data indicative of motion of the platform relative to a fixed reference frame;
transforming at least a portion of the received data into data indicative of motion of water relative to the fixed reference frame;
determining a directional wave spectrum based at least in part on the transformed data;
determining a non-directional wave spectrum based at least in part on the directional wave spectrum; and
deriving at least one wave characteristic based at least in part on at least one of the directional wave spectrum and the non-directional wave spectrum.

* * * * *